(12) United States Patent
Mizutani et al.

(10) Patent No.: US 11,192,609 B2
(45) Date of Patent: Dec. 7, 2021

(54) SHIFT CONTROL DEVICE AND GEAR SHIFTING DEVICE

(71) Applicant: SHIMANO INC., Sakai (JP)

(72) Inventors: Yuta Mizutani, Sakai (JP); Takeshi Ueda, Sakai (JP)

(73) Assignee: SHIMANO INC., Sakai (JP)

( * ) Notice: Subject to any disclaimer, the term of this patent is extended or adjusted under 35 U.S.C. 154(b) by 533 days.

(21) Appl. No.: 16/234,426

(22) Filed: Dec. 27, 2018

(65) Prior Publication Data

US 2020/0207443 A1    Jul. 2, 2020

(51) Int. Cl.
*B62M 25/08* (2006.01)
*B62M 9/132* (2010.01)
*B62M 9/122* (2010.01)

(52) U.S. Cl.
CPC ............ *B62M 25/08* (2013.01); *B62M 9/122* (2013.01); *B62M 9/132* (2013.01)

(58) Field of Classification Search
CPC .... B62M 9/132; B62M 25/045; B62M 25/08; B62M 9/122; B62M 25/04
USPC ..................................................... 474/70, 78
See application file for complete search history.

(56) References Cited

U.S. PATENT DOCUMENTS

| | | | | |
|---|---|---|---|---|
| 4,490,127 A * | 12/1984 | Matsumoto | ............ | B62M 9/122 280/236 |
| 4,938,733 A * | 7/1990 | Patterson | ............... | B62K 23/04 474/80 |
| 5,213,548 A * | 5/1993 | Colbert | ................... | B62M 25/08 280/238 |
| 5,357,177 A * | 10/1994 | Fey | ......................... | B62M 25/08 318/3 |
| 5,577,969 A * | 11/1996 | Watarai | .................. | B62M 9/122 474/78 |
| 5,599,244 A * | 2/1997 | Ethington | .............. | B62M 9/122 280/261 |
| 5,865,454 A * | 2/1999 | Campagnolo | .......... | B62M 25/08 280/238 |
| 6,634,971 B2 * | 10/2003 | Campagnolo | .......... | B62M 9/122 474/78 |
| 6,877,755 B2 * | 4/2005 | Takamoto | .............. | B62M 25/04 280/260 |

(Continued)

FOREIGN PATENT DOCUMENTS

| JP | 4922553 B2 | 2/2005 |
|---|---|---|
| JP | 5406469 B2 | 12/2008 |

*Primary Examiner* — Henry Y Liu
(74) *Attorney, Agent, or Firm* — Mori & Ward, LLP

(57) ABSTRACT

A shifting control device comprises a controller configured to control an actuator of a gear shifting device to arrange a chain guide of the gear shifting device on a plurality of gear positions. The controller is configured to control the actuator to temporarily arrange the chain guide on a first temporary position in a multistage gear shift operation before stopping the chain guide at the first target gear position. The controller is configured to temporarily arrange the chain guide on a second temporary position in a single gear shift operation before stopping the chain guide at the second target gear position. The first temporary position is offset from the second temporary position in the gear shift direction if the first target gear position is the first target gear position and the second target gear position correspond to the same gear position of the plurality of gear positions.

20 Claims, 26 Drawing Sheets

(56) References Cited

U.S. PATENT DOCUMENTS

| | | | | |
|---|---|---|---|---|
| 6,988,739 | B2* | 1/2006 | Guderzo | B62M 9/122 |
| | | | | 280/259 |
| 7,184,872 | B2* | 2/2007 | Guderzo | B62M 9/122 |
| | | | | 474/116 |
| 7,223,189 | B2* | 5/2007 | Guderzo | B62M 25/08 |
| | | | | 474/70 |
| 8,874,338 | B2* | 10/2014 | Miglioranza | B62M 25/08 |
| | | | | 701/66 |
| 9,008,931 | B2* | 4/2015 | Cheng | B62M 25/08 |
| | | | | 701/62 |
| 9,278,728 | B1* | 3/2016 | Sato | B62M 9/122 |
| 2001/0027495 | A1* | 10/2001 | Campagnolo | B62M 25/08 |
| | | | | 709/248 |
| 2003/0078716 | A1* | 4/2003 | Takeda | B62M 25/08 |
| | | | | 701/51 |
| 2003/0160420 | A1* | 8/2003 | Fukuda | B62M 25/04 |
| | | | | 280/260 |
| 2005/0043129 | A1* | 2/2005 | Guderzo | B62M 9/122 |
| | | | | 474/78 |
| 2005/0223840 | A1* | 10/2005 | Takamoto | B62M 25/08 |
| | | | | 74/502.2 |
| 2005/0255950 | A1* | 11/2005 | Takebayashi | B62M 9/122 |
| | | | | 474/70 |
| 2006/0189423 | A1* | 8/2006 | Ichida | B62M 9/131 |
| | | | | 474/80 |
| 2007/0232425 | A1* | 10/2007 | Ichida | B62M 25/08 |
| | | | | 474/70 |
| 2007/0270719 | A1* | 11/2007 | Jwo | B62M 25/08 |
| | | | | 600/587 |
| 2008/0312799 | A1* | 12/2008 | Miglioranza | B62M 9/122 |
| | | | | 701/66 |
| 2009/0204299 | A1* | 8/2009 | Miglioranza | B62M 25/08 |
| | | | | 701/51 |

* cited by examiner

| GEAR SHIFT DIRECTION | FIRST CURRENT GEAR POSITION (CRP1) | FIRST TARGET GEAR POSITION (TRP1) | | | | | | | | | | |
|---|---|---|---|---|---|---|---|---|---|---|---|---|
| | | RP1 (LOW) | RP2 | RP3 | RP4 | RP5 | RP6 | RP7 | RP8 | RP9 | RP10 | RP11 (TOP) |
| D41 (OS11) | RP1 | ↑ | TU0201 (N=1) | TU0302 (N=2) | TU0403 (N=3) | TU0504 (N=4) | TU0605 (N=5) | TU0706 (N=6) | TU0807 (N=7) | TU0908 (N=8) | TU1009 (N=9) | TU1110 (N=10) |
| | RP2 | | ↑ | TU0301 (N=1) | TU0402 (N=2) | TU0503 (N=3) | TU0604 (N=4) | TU0705 (N=5) | TU0806 (N=6) | TU0907 (N=7) | TU1008 (N=8) | TU1109 (N=9) |
| | RP3 | | | ↑ | TU0401 (N=1) | TU0502 (N=2) | TU0603 (N=3) | TU0704 (N=4) | TU0805 (N=5) | TU0906 (N=6) | TU1007 (N=7) | TU1108 (N=8) |
| | RP4 | | | | ↑ | TU0501 (N=1) | TU0602 (N=2) | TU0703 (N=3) | TU0804 (N=4) | TU0905 (N=5) | TU1006 (N=6) | TU1107 (N=7) |
| | RP5 | | | | | ↑ | TU0601 (N=1) | TU0702 (N=2) | TU0803 (N=3) | TU0904 (N=4) | TU1005 (N=5) | TU1106 (N=6) |
| | RP6 | | | | | | ↑ | TU0701 (N=1) | TU0802 (N=2) | TU0903 (N=3) | TU1004 (N=4) | TU1105 (N=5) |
| | RP7 | | | | | | | ↑ | TU0801 (N=1) | TU0902 (N=2) | TU1003 (N=3) | TU1104 (N=4) |
| | RP8 | | | | | | | | ↑ | TU0901 (N=1) | TU1002 (N=2) | TU1103 (N=3) |
| | RP9 | | | | | | | | | ↑ | TU1001 (N=1) | TU1102 (N=2) |
| | RP10 | | | | | | | | | | ↑ | TU1101 (N=1) |
| | RP11 | | | | | | | | | | | |
| AVAILABLE TEMPORARY POSITION | | | | | | | | | | | | |

← INF

| GEAR SHIFT DIRECTION | FIRST CURRENT GEAR POSITION (CRP1) | FIRST TARGET GEAR POSITION (TRP1) | | | | | | | | | | |
|---|---|---|---|---|---|---|---|---|---|---|---|---|
| | | RP1 (LOW) | RP2 | RP3 | RP4 | RP5 | RP6 | RP7 | RP8 | RP9 | RP10 | RP11 (TOP) |
| D42 (OS12) | RP11 | TD0110 (N=10) | TD0209 (N=9) | TD0308 (N=8) | TD0407 (N=7) | TD0506 (N=6) | TD0605 (N=5) | TD0704 (N=4) | TD0803 (N=3) | TD0902 (N=2) | TD1001 (N=1) | ↓ |
| | RP10 | TD0109 (N=9) | TD0208 (N=8) | TD0307 (N=7) | TD0406 (N=6) | TD0505 (N=5) | TD0604 (N=4) | TD0703 (N=3) | TD0802 (N=2) | TD0901 (N=1) | ↓ | |
| | RP9 | TD0108 (N=8) | TD0207 (N=7) | TD0306 (N=6) | TD0405 (N=5) | TD0504 (N=4) | TD0603 (N=3) | TD0702 (N=2) | TD0801 (N=1) | ↓ | | |
| | RP8 | TD0107 (N=7) | TD0206 (N=6) | TD0305 (N=5) | TD0404 (N=4) | TD0503 (N=3) | TD0602 (N=2) | TD0701 (N=1) | ↓ | | | |
| | RP7 | TD0106 (N=6) | TD0205 (N=5) | TD0304 (N=4) | TD0403 (N=3) | TD0502 (N=2) | TD0601 (N=1) | ↓ | | | | |
| | RP6 | TD0105 (N=5) | TD0204 (N=4) | TD0303 (N=3) | TD0402 (N=2) | TD0501 (N=1) | ↓ | | | | | |
| | RP5 | TD0104 (N=4) | TD0203 (N=3) | TD0302 (N=2) | TD0401 (N=1) | ↓ | | | | | | |
| | RP4 | TD0103 (N=3) | TD0202 (N=2) | TD0301 (N=1) | ↓ | | | | | | | |
| | RP3 | TD0102 (N=2) | TD0201 (N=1) | ↓ | | | | | | | | |
| | RP2 | TD0101 (N=1) | ↓ | | | | | | | | | |
| | RP1 | ↓ | | | | | | | | | | |
| AVAILABLE TEMPORARY POSITION | | | | | | | | | | | | |

INF

SHIFT CONTROL DEVICE AND GEAR SHIFTING DEVICE

FIELD OF THE INVENTION

The present invention relates to a shift control device and a gear shifting device.

DISCUSSION OF THE BACKGROUND

A human-powered vehicle includes a gear shift control device configured to control a gear changing device.

SUMMARY OF THE INVENTION

In accordance with a first aspect of the present invention, a shifting control device for a human-powered vehicle comprises a controller configured to control an actuator of a gear shifting device to arrange a chain guide of the gear shifting device on a plurality of gear positions. The controller is configured to execute a multistage gear shift operation to accomplish a movement between at least three gear positions in a gear shift direction. The controller is configured to control the actuator to move the chain guide from a first current gear position to a first target gear position in a gear shift direction and to temporarily arrange the chain guide on a first temporary position in the multistage gear shift operation before stopping the chain guide at the first target gear position. The controller is configured to execute a single gear shift operation to accomplish a movement between two gear positions in the gear shift direction. The controller is configured to control the actuator to move the chain guide from a second current gear position to a second target gear position in the gear shift direction and to temporarily arrange the chain guide on a second temporary position in the single gear shift operation before stopping the chain guide at the second target gear position. The first temporary position is offset from the second temporary position in the gear shift direction if the first target gear position is the first target gear position and the second target gear position correspond to the same gear position of the plurality of gear positions.

With the shift control device according to the first aspect, it is possible to adjust the first temporary position and the second temporary position in accordance with difference between the multistage gear shift operation and the single gear shift operation. This can smooth the multistage gear shift operation and/or the single gear shift operation.

In accordance with a second aspect of the present invention, the shift control device according to the first aspect is configured so that the controller is configured to vary the first temporary position based on multistage-gear-shift information relating to the multistage gear shift operation.

With the shift control device according to the second aspect, it is possible to adjust the first temporary position corresponding to each of first target gear positions in accordance with the multistage gear shift operation.

In accordance with a third aspect of the present invention, a shifting control device for a human-powered vehicle comprises a controller configured to control an actuator of a gear shifting device to arrange a chain guide of the gear shifting device on a plurality of gear positions. The controller is configured to execute a multistage gear shift operation to accomplish a movement between at least three gear positions in a gear shift direction. The controller is configured to control the actuator to move the chain guide from a first current gear position to a first target gear position in a gear shift direction and to temporarily arrange the chain guide on a first temporary position in the multistage gear shift operation before stopping the chain guide at the first target gear position. The controller is configured to vary the first temporary position based on multistage-gear-shift information relating to the multistage gear shift operation.

With the shift control device according to the third aspect, it is possible to adjust the first temporary position corresponding to each of first target gear positions in accordance with the multistage gear shift operation.

In accordance with a fourth aspect of the present invention, the shift control device according to the second or third aspect is configured so that the controller includes a memory configured to store the plurality of gear positions and the multistage-gear-shift information.

With the shift control device according to the fourth aspect, it is possible to utilize the multistage-gear-shift information stored in the memory as necessary.

In accordance with a fifth aspect of the present invention, the shift control device according to any one of the second to fourth aspects is configured so that the multistage-gear-shift information includes a plurality of available temporary positions. The plurality of available temporary positions is partly different from each other.

With the shift control device according to the fifth aspect, it is possible to select one of the plurality of available temporary positions to vary the first temporary position.

In accordance with a sixth aspect of the present invention, the shift control device according to the fifth aspect is configured so that the controller is configured to select one temporary position from the plurality of available temporary positions to vary the first temporary position.

With the shift control device according to the sixth aspect, it is possible to effectively vary the first temporary position.

In accordance with a seventh aspect of the present invention, the shift control device according to the sixth aspect is configured so that the multistage-gear-shift information includes the gear shift direction. The controller is configured to select one temporary position from the plurality of available temporary positions to vary the first temporary position based on the gear shift direction.

With the shift control device according to the seventh aspect, it is possible to more effectively vary the first temporary position.

In accordance with an eighth aspect of the present invention, the shift control device according to any one of the second to seventh aspects is configured so that the multistage-gear-shift information includes a total number of a plurality of single gear shift control commands periodically transmitted from the operating device in response to a single user input.

With the shift control device according to the eighth aspect, it is possible to select one of the plurality of available temporary positions to vary the first temporary position in accordance with the total number of the plurality of single gear shift control commands.

In accordance with a ninth aspect of the present invention, the shift control device according to the sixth aspect is configured so that the controller is configured to select one temporary position from the plurality of available temporary positions to vary the first temporary position based on the total number of the plurality of single gear shift control commands.

With the shift control device according to the ninth aspect, it is possible to effectively vary the first temporary position using the total number of the plurality of single gear shift control commands.

In accordance with a tenth aspect of the present invention, the shift control device according to the eighth or ninth aspect is configured so that the controller is configured to count the total number of the plurality of single gear shift control commands.

With the shift control device according to the tenth aspect, it is possible to obtain the total number of the plurality of single gear shift control commands.

In accordance with an eleventh aspect of the present invention, the shift control device according to any one of the eighth to tenth aspects is configured so that the controller is configured to select the first target gear position from the plurality of gear positions based on the first current gear position and the total number of the plurality of single gear shift control commands.

With the shift control device according to the eleventh aspect, it is possible to obtain the first target gear position.

In accordance with a twelfth aspect of the present invention, the shift control device according to the sixth aspect is configured so that the multistage-gear-shift information includes the first current gear position. The controller is configured to select one temporary position from the plurality of available temporary positions to vary the first temporary position based on the first current gear position.

With the shift control device according to the twelfth aspect, it is possible to effectively vary the first temporary position.

In accordance with thirteenth aspect of the present invention, the shift control device according to the sixth aspect is configured so that the multistage-gear-shift information includes the first target gear position. The controller is configured to select one temporary position from the plurality of available temporary positions to vary the first temporary position based on the first target gear position.

With the shift control device according to the thirteenth aspect, it is possible to more effectively vary the first temporary position.

In accordance with a fourteenth aspect of the present invention, the shift control device according to any one of the first to thirteenth aspects is configured so that the controller is configured to execute the multistage gear shift operation in response to the plurality of single gear shift control commands periodically transmitted from the operating device to a single user input.

With the shift control device according to the fourteenth aspect, it is possible to reliably execute the multistage gear shift operation.

In accordance with a fifteenth aspect of the present invention, the shift control device according to the fourteenth aspect is configured so that the controller is configured to determine a termination of the plurality of single gear shift control commands periodically transmitted from the operating device in response to the single user input. The controller is configured to control the actuator to temporarily arrange the chain guide on the first temporary position in the multistage gear shift operation in response to the termination of the plurality of single gear shift control commands.

With the shift control device according to the fifteenth aspect, it is possible to reliably arrange the chain guide on the first temporary position.

In accordance with a sixteenth aspect of the present invention, the shift control device according to any one of the first to fifteenth aspects is configured so that the first temporary position is provided between the first current gear position and the first target gear position.

With the shift control device according to the sixteenth aspect, it is possible to reduce interference between the chain and the sprocket corresponding to the first target gear position in the multistage gear shift operation. This can smoothly bring the chain into engagement with the sprocket corresponding to the first target gear position in the multistage gear shift operation.

In accordance with a seventeenth aspect of the present invention, the shift control device according to any one of the first to fifteenth aspects is configured so that the first target gear position is provided between the first temporary position and the first current gear position.

With the shift control device according to the seventeenth aspect, it is possible to reliably bring the chain into the sprocket corresponding to the first target gear position in the multistage gear shift operation.

In accordance with an eighteenth aspect of the present invention, the shift control device according to the first or second aspect is configured so that the second temporary position is provided between the second current gear position and the second target gear position.

With the shift control device according to the eighteenth aspect, it is possible to reduce interference between the chain and the sprocket corresponding to the second target gear position in the single gear shift operation. This can smoothly bring the chain into engagement with the sprocket corresponding to the first target gear position in the multistage gear shift operation.

In accordance with a nineteenth aspect of the present invention, the shift control device according to the first or second aspect is configured so that the second target gear position is provided between the second temporary position and the second current gear position.

With the shift control device according to the nineteenth aspect, it is possible to reliably bring the chain into the sprocket corresponding to the first target gear position in the single gear shift operation.

In accordance with a twentieth aspect of the present invention, a gear shifting device for a human-powered vehicle comprises a base member, the chain guide movably coupled to the base member, the actuator configured to move the chain guide relative to the base member, and the shifting control device according to any one of the first to nineteenth aspects.

With the gear shifting device according to the twentieth aspect, it is possible to smooth the multistage gear shift operation and/or the single gear shift operation in the gear shifting device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 21 and 22 show multistage-gear-shift information.

DESCRIPTION OF THE EMBODIMENTS

Figure 1:
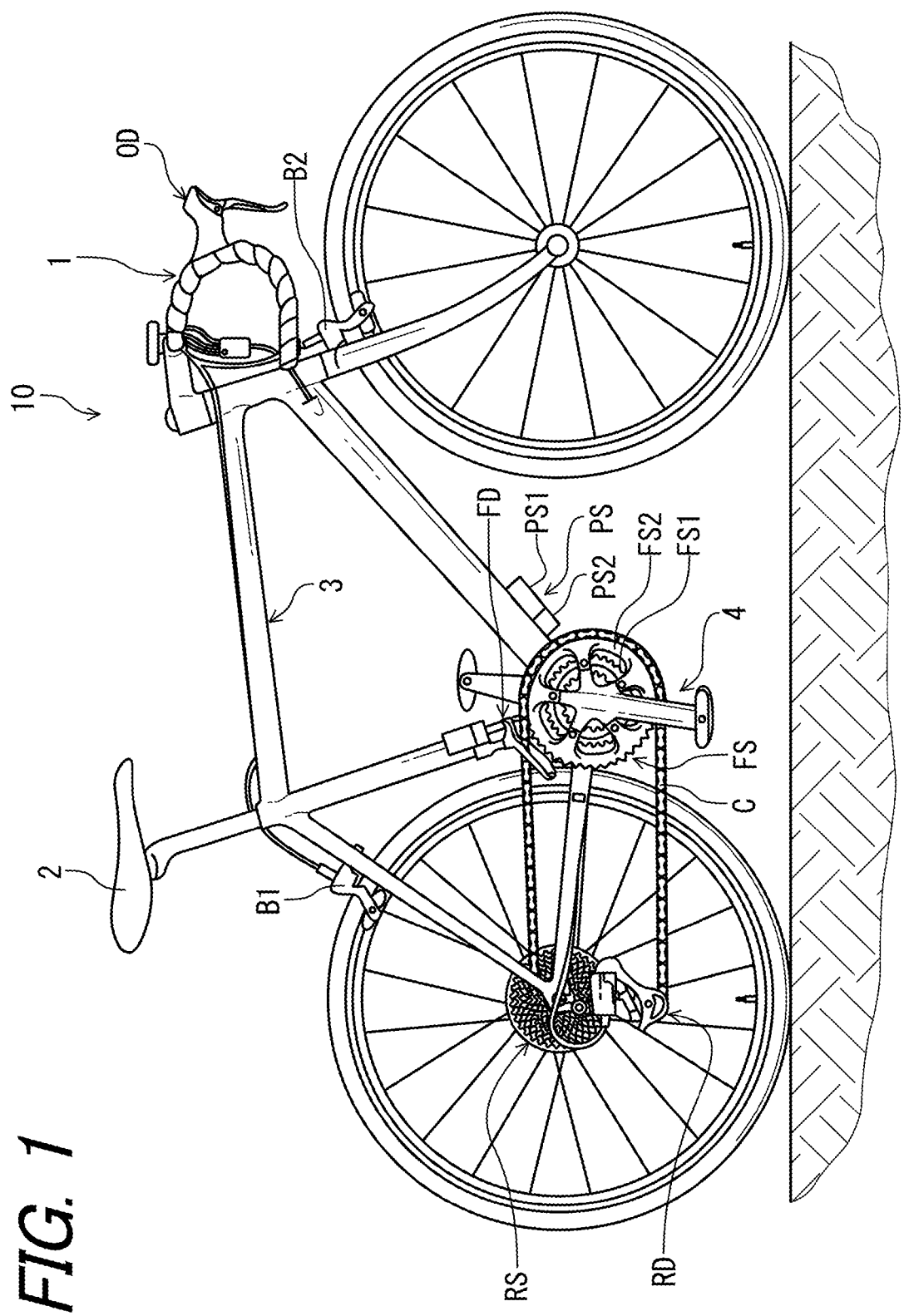
FIG. 1 is a side elevational view of a human-powered vehicle provided with a shift control device in accordance with an embodiment.

The embodiment(s) will now be described with reference to the accompanying drawings, wherein like reference numerals designate corresponding or identical elements throughout the various drawings.

Referring initially to FIG. 1, a human-powered vehicle 10 is illustrated that is equipped with a gear shifting device RD in accordance with an embodiment. For example, the human-powered vehicle 10 is a vehicle to travel with a motive power including at least a human power of a user who rides the human-powered vehicle 10 (i.e., rider). The human-powered vehicle 10 has an arbitrary number of wheels. For example, the human-powered vehicle 10 has at least one wheel. In this embodiment, the human-powered vehicle 10 preferably has a smaller size than that of a four-wheeled automobile. However, the human-powered vehicle 10 can have an arbitrary size. For example, the human-powered vehicle 10 can have a larger size than that of the four-wheeled automobile. Examples of the human-powered vehicle 10 include a bicycle, a tricycle, and a kick scooter. In this embodiment, the human-powered vehicle 10 is a bicycle. An electric assisting system including an electric motor can be applied to the human-powered vehicle 10 (e.g., the bicycle) to assist muscular motive power of the user. Namely, the human-powered vehicle 10 can be an E-bike. While the human-powered vehicle 10 is illustrated as a road bike, the gear shifting device RD can be applied to mountain bikes or any type of human-powered vehicles.

As seen in FIG. 1, the human-powered vehicle 10 includes a handlebar 1, a saddle 2, a vehicle body 3, a crank assembly 4, a sprocket assembly RS, an operating device OD, the gear shifting device RD, and an additional gear shifting device FD. The operating device OD is mounted to the handlebar 1. The crank assembly 4 includes an additional sprocket assembly FS. The additional sprocket assembly FS includes a first front sprocket FS1 and a second front sprocket FS2. A chain C is engaged with the sprocket assembly RS and the additional sprocket assembly FS. The additional gear shifting device FD is configured to shift the chain C between a plurality of gear positions in response to operation of the operating device OD. The gear shifting device RD is configured to shift the chain C between a plurality of gear positions in response to operation of the operating device OD. The operating device OD includes a rear brake operating device via which a user operates a rear braking device B1 and a front operating device via which a user operates a front braking device B2.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle 2 of the human-powered vehicle 10 with facing the handlebar 1. Accordingly, these terms, as utilized to describe components, should be interpreted relative to the human-powered vehicle 10 equipped with the components as used in an upright riding position on a horizontal surface.

Figure 2:
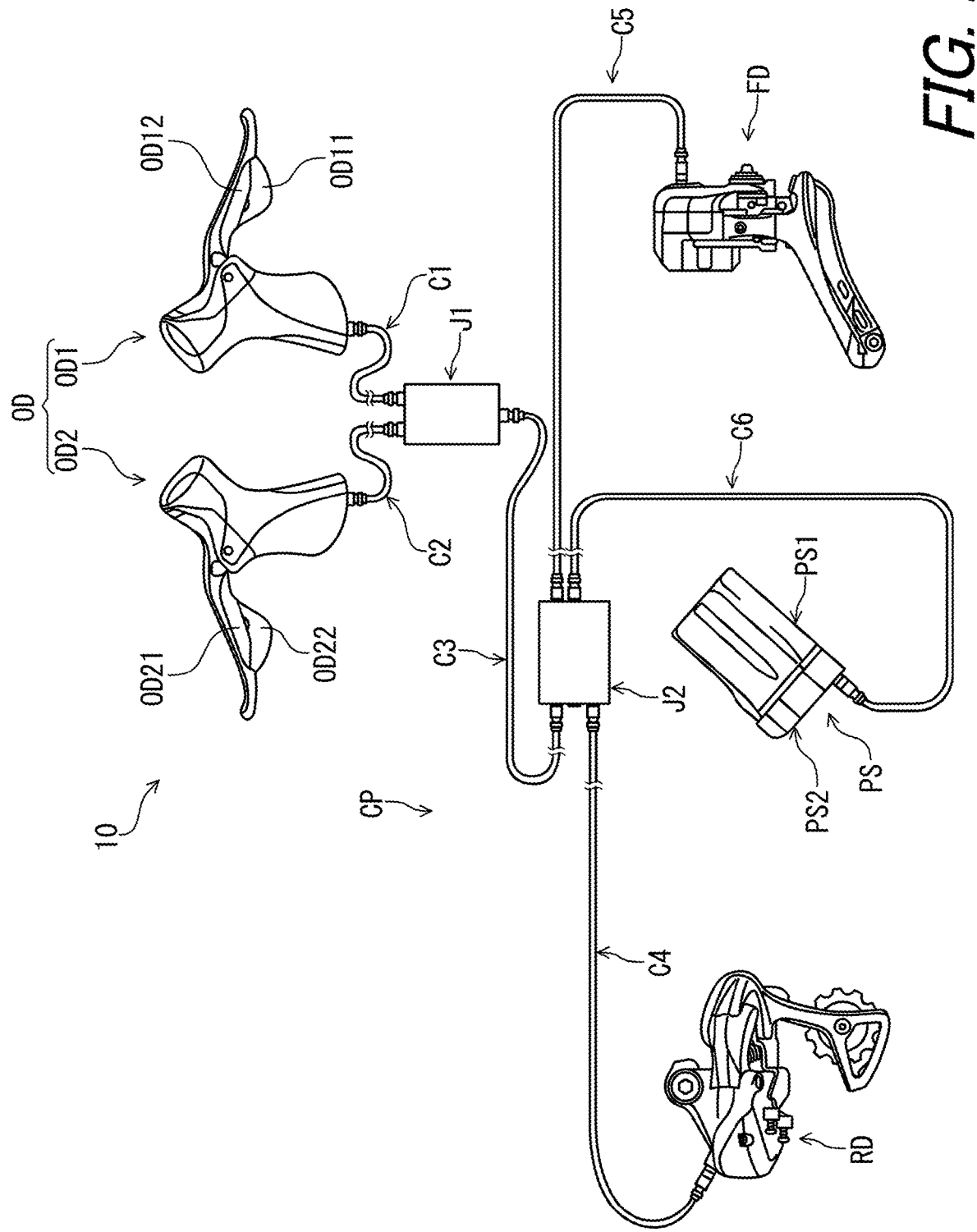
FIG. 2 is a schematic diagram of the shift control device illustrated in FIG. 1.

As seen in FIG. 2, the human-powered vehicle 10 includes a power supply PS. The power supply PS is electrically connected to the operating device OD, the gear shifting device RD, and the additional gear shifting device FD to supply electricity to the operating device OD, the gear shifting device RD, and the additional gear shifting device FD. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the gear shifting device RD, the additional gear shifting device FD, and other electric components.

The battery holder PS2 is mounted to the vehicle body 3 (FIG. 1) and is electrically connected to the operating device OD, the gear shifting device RD, and the additional gear shifting device FD to supply electricity from the battery PS1 to the operating device OD, the gear shifting device RD, and the additional gear shifting device FD.

As seen in FIG. 2, the human-powered vehicle 10 comprises an electric communication path CP. The electric communication path CP operatively connects electric components to each other. For example, the electric communication path CP includes electric cables C1 to C6 and electric junctions J1 and J2. However, the electric communication path CP can at least partly include a wireless communication path.

The operating device OD includes an operating device OD1 and an operating device OD2. The operating device OD1 can also be referred to as a first operating device OD1. The operating device OD2 can also be referred to as a second operating device OD2. The operating device OD1 is connected to the electric junction J1 with the electric cable C1. The operating device OD2 is connected to the electric junction J1 with the electric cable C2. The electric junction J1 is connected to the electric junction J2 with the electric cable C3. The gear shifting device RD is connected to the electric junction J2 with the electric cable C4. The additional gear shifting device FD is connected to the electric junction J2 with the electric cable C5. The battery holder PS2 is connected to the electric junction J2 with the electric cable C6. Thus, the power supply PS is electrically connected to the operating device OD, the gear shifting device RD, and the additional gear shifting device FD with the electric cables C1 to C6 and the electric junctions J1 and J2.

Figure 3:
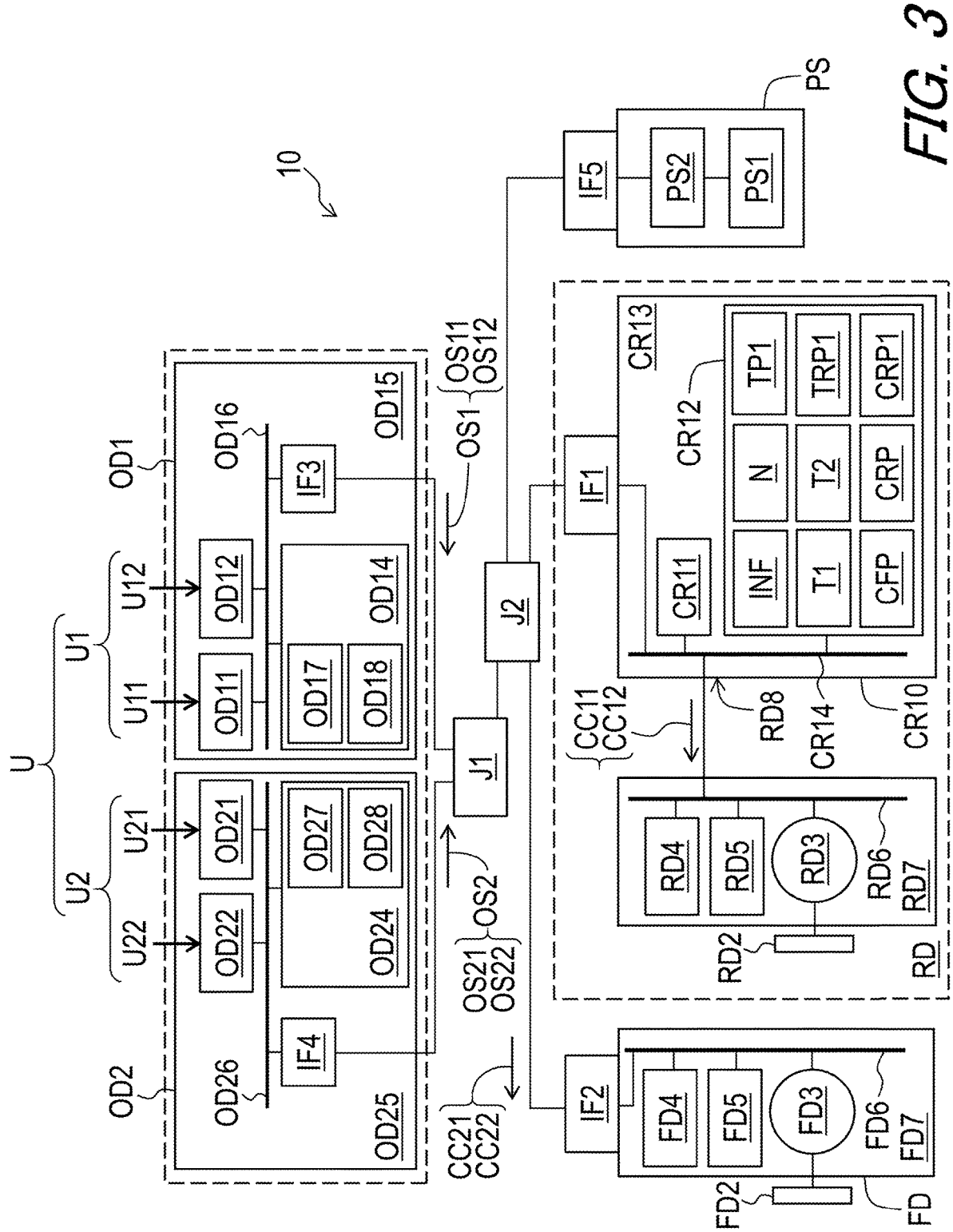
FIG. 3 is a schematic block diagram of the shift control device illustrated in FIG. 1.

As seen in FIG. 3, the operating device OD is configured to receive a user input U to operate the additional gear shifting device FD and the gear shifting device RD. However, the operating device OD can be configured to receive another user input to operate another bicycle component.

The user input U includes shift-changing user inputs U1 and U2. In this embodiment, the shift-changing user input U1 includes a first upshift user input U11 and a first downshift user input U12. The shift-changing user input U2 includes a second upshift user input U21 and a second downshift user input U22. In this embodiment, the first upshift user input U11 can also be referred to as a rear upshift user input U11. The first downshift user input U12 can be referred to as a rear downshift user input U12. The second upshift user input U21 can also be referred to as a front upshift user input U21. The second downshift user input U22 can also be referred to as a front downshift user input U22.

In this embodiment, the operating device OD1 is configured to generate a gear shift control command OS1 in response to the shift-changing user input U1. The operating device OD1 includes a first upshift switch OD11, a first downshift switch OD12, a first operation controller OD14, and a first circuit board OD15. The first upshift switch OD11, the first downshift switch OD12, and the first operation controller OD14 are electrically mounted on the first circuit board OD15 and are electrically connected to each other with a bus OD16. The first upshift switch OD11 is configured to receive the first upshift user input U11 from the user. The first upshift switch OD11 is configured to generate a first upshift command OS11 in response to the first upshift user input U11. The first downshift switch OD12 is configured to receive the first downshift user input U12 from the user. The first downshift switch OD12 is configured to generate a first downshift command OS12 in response to the first downshift user input U12. For example, each of the first upshift switch OD11 and the first downshift switch OD12 includes a push-button switch.

The first operation controller OD14 is electrically connected to the first upshift switch OD11 to generate the first upshift command OS11 in response to the first upshift input U11 received by the first upshift switch OD11. The first operation controller OD14 is electrically connected to the first downshift switch OD12 to generate the first downshift command OS12 in response to the first downshift user input U12 received by the first downshift switch OD12.

In this embodiment, the first operation controller OD14 includes a processor OD17 and a memory OD18. The processor OD17 and the memory OD18 are electrically mounted on the first circuit board OD15. The processor OD17 includes a central processing unit (CPU) and a memory controller. The memory OD18 is electrically connected to the processor OD17. The memory OD18 includes a read only memory (ROM) and a random-access memory (RAM). The ROM includes a non-transitory computer-readable storage medium. The RAM includes a transitory computer-readable storage medium. The memory OD18 includes storage areas each having an address in the ROM and the RAM. The processor OD17 controls the memory OD18 to store data in the storage areas of the memory OD18 and reads data from the storage areas of the memory OD18. The memory OD18 (e.g., the ROM) stores a program. The program is read into the processor OD17, and thereby functions of the first operation controller OD14 is performed.

Figure 4:
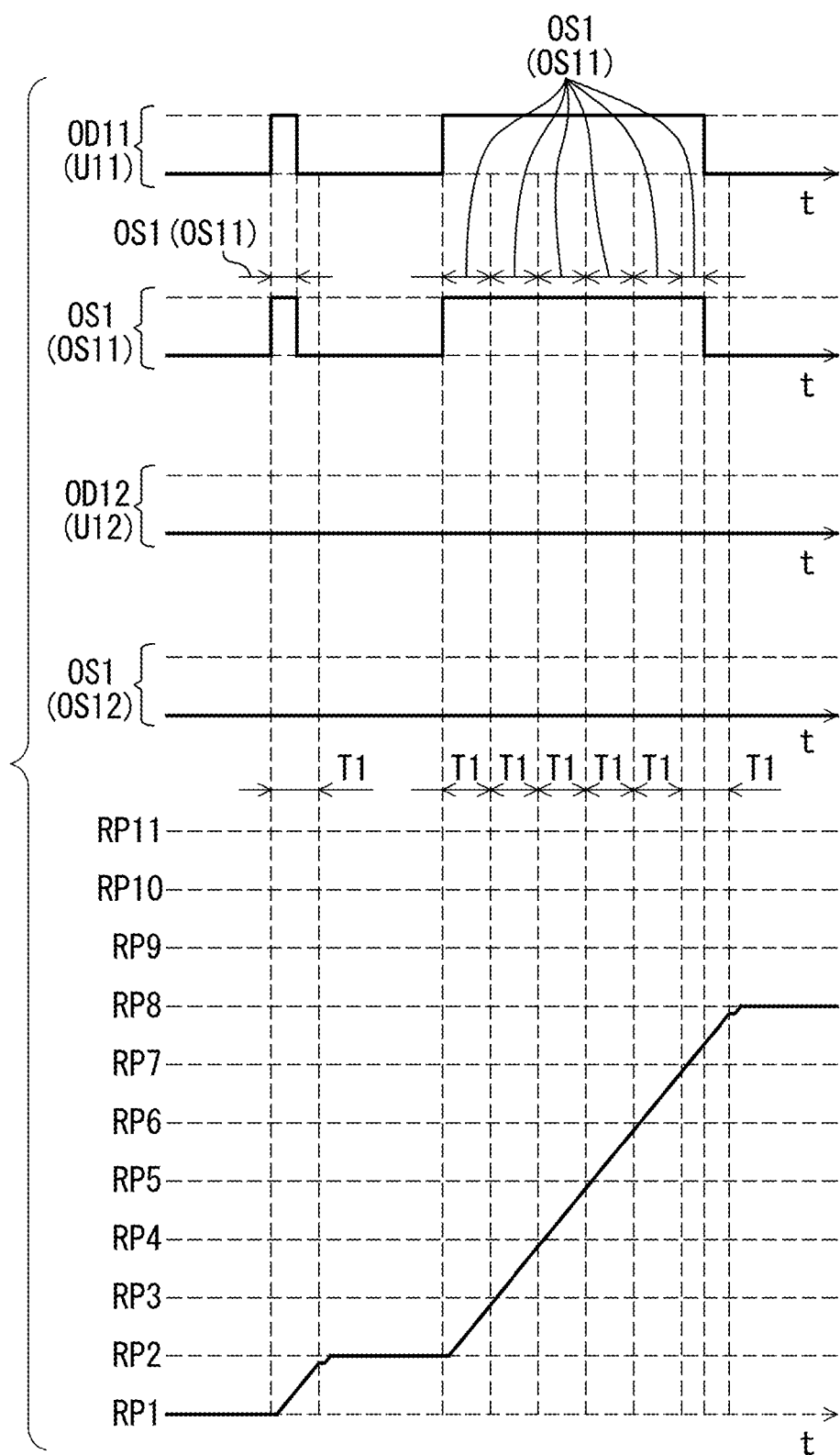
FIG. 4 is a flow chart showing an operation of the shift control device illustrated in FIG. 1 (upshift).
Figure 5:
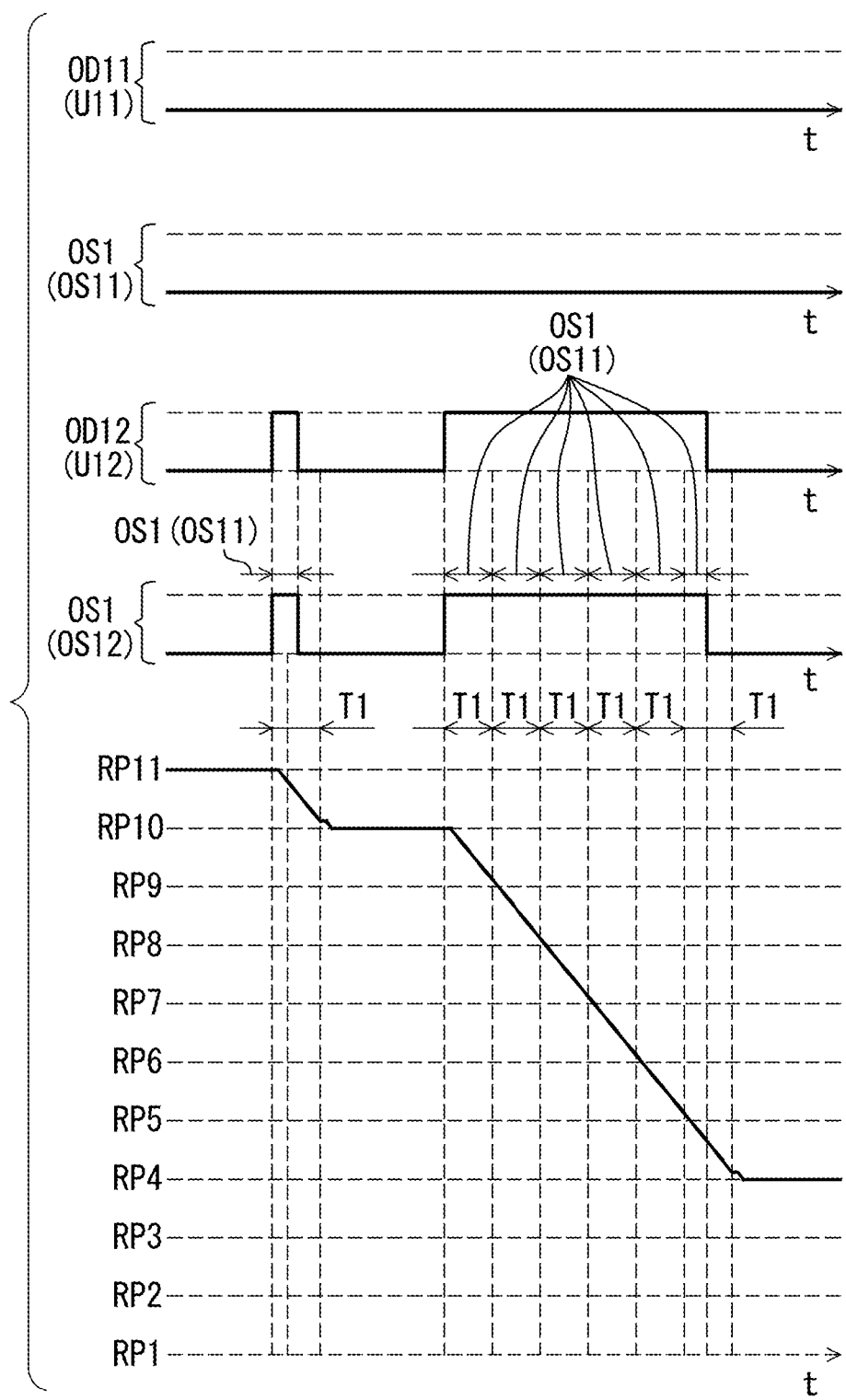
FIG. 5 is a flow chart showing an operation of the shift control device illustrated in FIG. 1 (downshift).

As seen in FIGS. 4 and 5, the operating device OD1 is configured to generate at least one gear shift control command OS1 (at least one first upshift commands OS11 or at least one first upshift commands OS12) having a total number that depends on a single time period during which operating device OD1 continuously receives the shift-changing user input U11 (the first upshift input U11 or the first downshift input U12). The shift-changing user input U1 can also be referred to as a single user input U1.

As seen in FIG. 4, the first operation controller OD14 is configured to generate at least one first upshift commands OS11 having a total number that depends on a single time period during which first upshift switch OD11 continuously receives the first upshift input U11. The first upshift input U11 can also be referred to as a single user input U11. As seen in FIG. 5, the first operation controller OD14 is configured to generate at least one first downshift commands OS12 having a total number that depends on a single time period during which first downshift switch OD12 continuously receives the first downshift input U12. The first downshift input U12 can also be referred to as a single user input U12. However, the operating device OD1 can be configured to transmit a plurality of single gear shift control commands OS1 (a plurality of first upshift commands OS11 or a plurality of first downshift commands OS12) which are intermittently generated in response to the single user input U1 (the single user input U11 or U12).

In this embodiment, as seen in FIGS. 4 and 5, the first operation controller OD14 is configured to generate the plurality of single gear shift control commands OS1 periodically transmitted from the operating device OD1 in response to the single user input U1 such as a long press of one of the first upshift switch OD11 and the first downshift switch OD12. For example, as seen in FIG. 4, the first operation controller OD14 is configured to generate the plurality of first upshift commands OS11 periodically transmitted from the operating device OD1 in response to the single user input U11 such as a long press of the first upshift switch OD11. As seen in FIG. 5, the first operation controller OD14 is configured to generate the plurality of first downshift commands OS12 periodically transmitted from the operating device OD1 in response to the single user input U12 such as a long press of the first downshift switch OD12.

Examples of the first upshift switch OD11 include a single-stage push button switch and a multistage (e.g., two-stage) push button switch. Examples of the first downshift switch OD12 include a single stage push button switch and a multistage (e.g., two-stage) push button switch. For example, the long press of the first upshift switch OD11 can include a long press of the single-stage push button switch and a long press of one of a first-stage and a second stage of the two-stage push button switch. The long press of the first downshift switch OD12 can include a long press of the single-stage push button switch and a long press of one of a first-stage and a second stage of the two-stage push button switch.

In this embodiment, the first operation controller OD14 is configured to generate the plurality of single gear shift control commands OS1 periodically and continuously transmitted from the operating device OD1 in response to the single user input U1. The first operation controller OD14 is configured to generate the plurality of single first upshift commands OS11 periodically and continuously transmitted from the operating device OD1 in response to the single user input U11. The first operation controller OD14 is configured to generate the plurality of single first downshift commands OS12 periodically and continuously transmitted from the operating device OD1 in response to the single user input U12. However, the first operation controller OD14 can be configured to generate the plurality of single gear shift control commands OS1 periodically and intermittently transmitted from the operating device OD1 in response to the single user input U1. The first operation controller OD14 can be configured to generate the plurality of single first upshift commands OS11 periodically and intermittently transmitted from the operating device OD1 in response to the single user input U11. The first operation controller OD14 is configured to generate the plurality of single first downshift commands OS12 periodically and intermittently transmitted from the operating device OD1 in response to the single user input U12.

As seen in FIG. 3, the operating device OD2 includes a second upshift switch OD21, a second downshift switch OD22, a second operation controller OD24, and a second circuit board OD25. The second upshift switch OD21, the second downshift switch OD22, and the second operation controller OD24 are electrically mounted on the second circuit board OD25 and are electrically connected to each other with a bus OD26. The second upshift switch OD21 is configured to receive the second upshift user input U21 from the user. The second upshift switch OD21 is configured to generate a second upshift command OS21 in response to the second upshift user input U21. The second downshift switch OD22 is configured to receive the second downshift user input U22 from the user. The second downshift switch OD22 is configured to generate a second downshift command OS22 in response to the second downshift user input U22. For example, each of the second upshift switch OD21 and the second downshift switch OD22 includes a push-button switch.

The second operation controller OD24 is electrically connected to the second upshift switch OD21 to generate the second upshift command OS21 in response to the second upshift user input U21 received by the second upshift switch OD21. The second operation controller OD24 is electrically connected to the second downshift switch OD22 to generate the second downshift command OS22 in response to the second downshift user input U22 received by the second downshift switch OD22.

In this embodiment, the second operation controller OD24 includes a processor OD27 and a memory OD28. The processor OD27 and the memory OD28 are electrically mounted on the second circuit board OD25. The processor OD27 includes a CPU and a memory controller. The memory OD28 is electrically connected to the processor OD27. The memory OD28 includes a ROM and a RAM. The ROM includes a non-transitory computer-readable storage medium. The RAM includes a transitory computer-readable storage medium. The memory OD28 includes storage areas each having an address in the ROM and the RAM. The processor OD27 controls the memory OD28 to store data in the storage areas of the memory OD28 and reads data from the storage areas of the memory OD28. The memory OD28 (e.g., the ROM) stores a program. The program is read into the processor OD27, and thereby functions of the second operation controller OD24 is performed.

Figure 6:
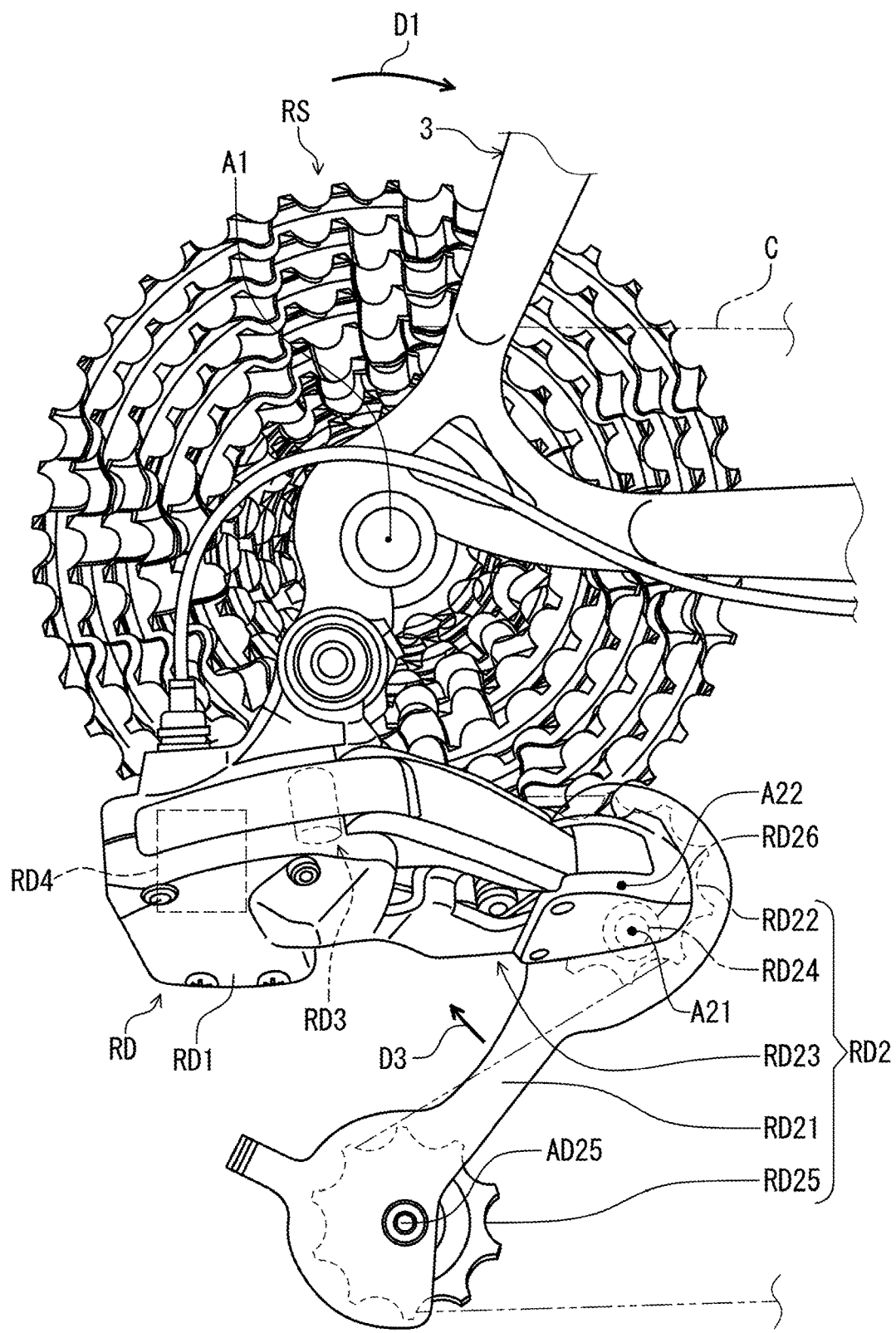
FIG. 6 is a side elevational view of a sprocket assembly and a gear shifting device of the human-powered vehicle illustrated in FIG. 1.

As seen in FIG. 6, the gear shifting device RD for the human-powered vehicle 10 comprises a base member RD1, a chain guide RD2, an actuator RD3, and a shifting control device RD8. The base member RD1 is mounted to the vehicle body 3. The chain guide RD2 is movably coupled to the base member RD1. The actuator RD3 is configured to move the chain guide RD2 relative to the base member RD1.

The chain guide RD2 includes a guide plate RD21, a guide pulley RD22, and a link structure RD23. The guide pulley RD22 is rotatably coupled to the guide plate RD21 about a rotational axis A22. The link structure RD23 movably couples the guide plate RD21 to the base member RD1. The guide plate RD21 is pivotally coupled to the link structure RD23 about a pivot axis A21 with a pivot shaft RD24. The rotational axis A22 of the guide pulley RD22 is offset from the pivot axis A21 of the guide plate RD21 when viewed along the rotational axis A22. The actuator RD3 is coupled to the link structure RD23 to move the guide plate RD21 relative to the base member RD1.

The chain guide RD2 includes an additional guide pulley RD25. The additional guide pulley RD25 is rotatably coupled to the guide plate RD21 about an additional rotational axis A25. The additional rotational axis A25 of the additional guide pulley RD25 is offset from the rotational axis A22 of the guide pulley RD22 and the pivot axis A21 of the guide plate RD21 when viewed along the rotational axis A22.

The chain guide RD2 includes a tension biasing member RD26 to bias the guide plate RD21 in a tension direction D3. A pivotal orientation of the guide plate RD21 changes about the pivot axis A21 relative to the base member RD1 in response to tension of the chain C. Namely, the pivotal orientation of the guide plate RD21 changes about the pivot axis A21 relative to the base member RD1 based on a current shift position of the gear shifting device RD and a current shift position of the additional gear shifting device FD.

Figure 7:
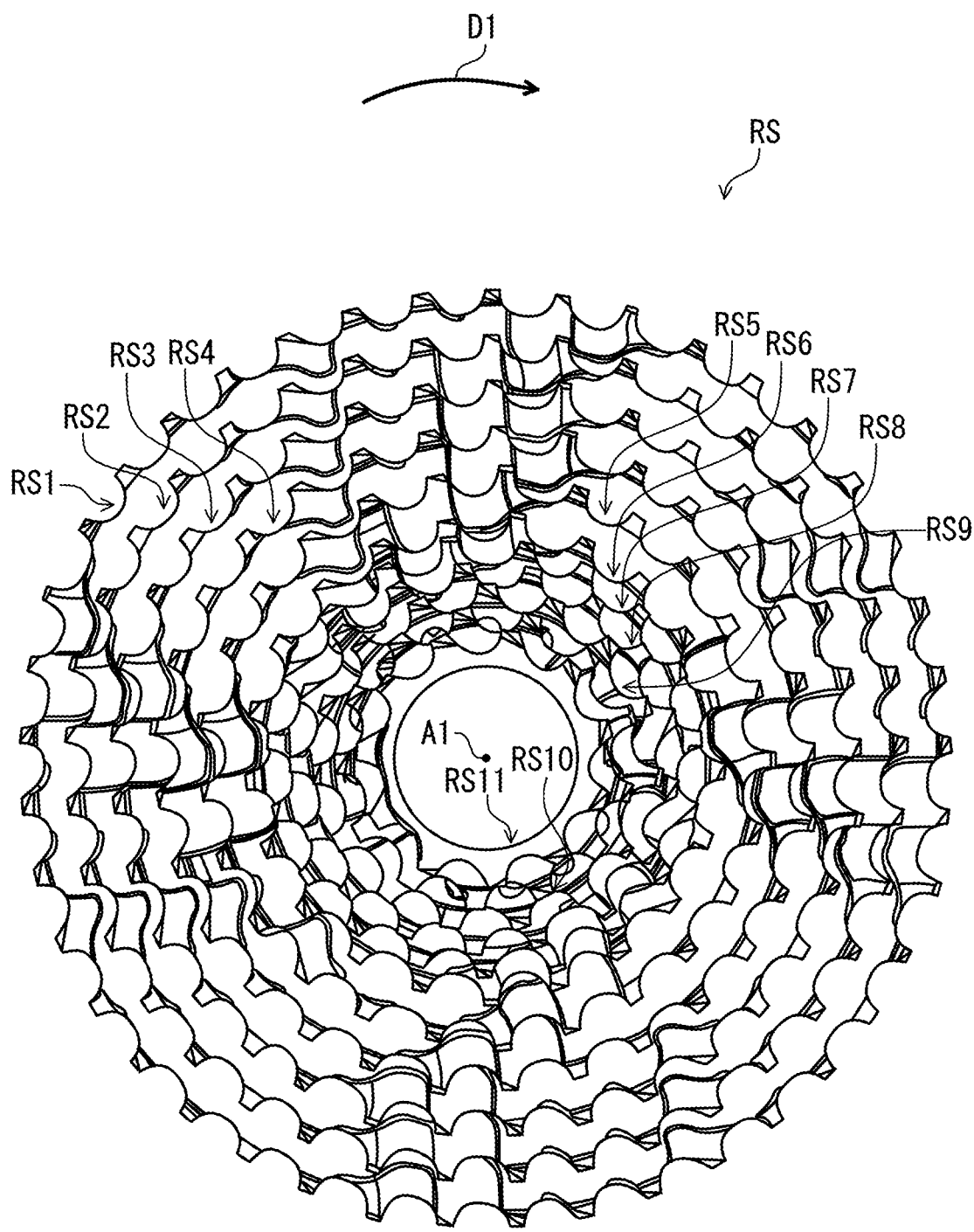
FIG. 7 is a side elevational view of the sprocket assembly of the human-powered vehicle illustrated in FIG. 1.

As seen in FIG. 7, the sprocket assembly RS has a rotational center axis A1 and is rotatable about the rotational center axis A1 in a rotational driving direction D1. The sprocket assembly RS includes a plurality of sprockets. In this embodiment, the sprocket assembly RS includes first to eleventh rear sprockets RS1 to RS11. However, a total number of the rear sprockets is not limited to this embodiment. The first rear sprocket RS1 has the largest pitch-circle diameter in the sprocket assembly RS and corresponds to low gear. The eleventh rear sprocket RS11 has the smallest pitch-circle diameter in the sprocket assembly RS and corresponds to top gear.

Figure 8:
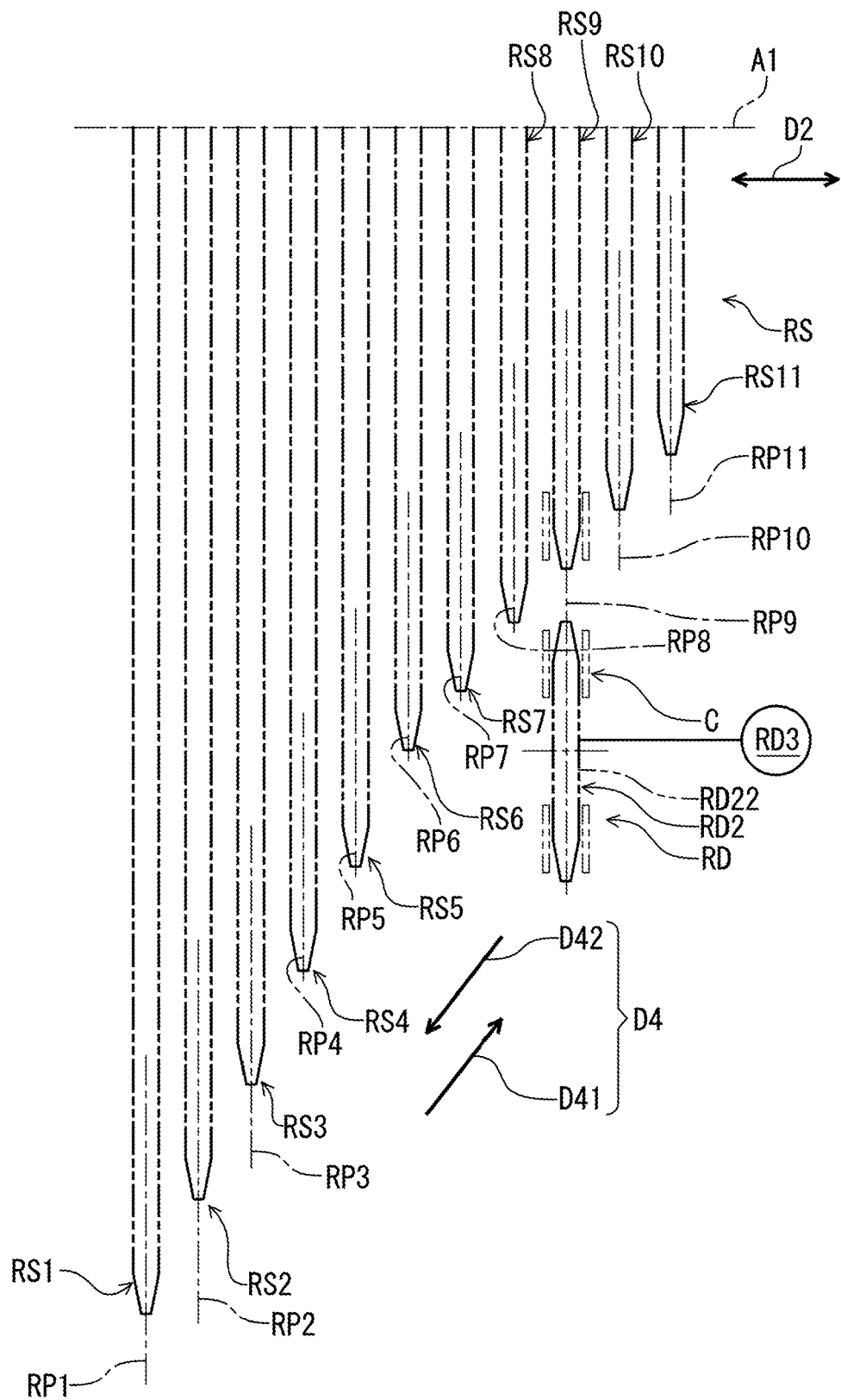
FIG. 8 is a partial rear schematic view of the sprocket assembly and the gear shifting device of the bicycle illustrated in FIG. 1.

As seen in FIG. 8, the first to eleven rear sprockets RS1 to RS11 are arranged in an axial direction D2 parallel to the rotational center axis A1. The first to eleventh rear sprockets RS1 to RS11 are spaced apart from each other in the axial direction D2. The chain C is shifted relative to the sprocket assembly RS in a gear shift direction D4. In the illustrated embodiment, upshifting occurs when the gear shifting device RD shifts the chain C from a larger sprocket to a neighboring smaller sprocket in an upshifting direction D41. Downshifting occurs when the gear shifting device RD shifts the chain C from a smaller sprocket to a neighboring larger sprocket in a downshifting direction D42. The gear shift direction D4 includes the upshifting direction D41 and the downshifting direction D42. The downshifting direction D42 is an opposite direction of the upshifting direction D41.

The chain guide RD2 is movable relative to the sprocket assembly RS in the upshifting direction D41 and the downshifting direction D42. The actuator RD3 is configured to move the chain guide RD2 to shift the chain C in the upshifting direction D41 and the downshifting direction D42.

In this embodiment, the gear shifting device RD has a plurality of gear positions RP1 to RP11 corresponding to the plurality of rear sprockets RS1 to RS11. The gear position RP1 corresponds to low gear, and the gear position RP11 corresponds to top gear. The actuator RD3 is operatively coupled to the chain guide RD2 to move the chain guide RD2 relative to the base member RD1 among the plurality of gear positions RP1 to RP11 and to stop the chain guide RD2 relative to the base member RD1 in any one position of the plurality of gear positions RP1 to RP11. A total number of the gear positions is not limited to this embodiment.

In the present application, the term "gear position" can encompass a position of the chain guide RD2 relative to the base member RD1 and/or a sprocket corresponding to a position of the chain guide RD2.

Figure 9:
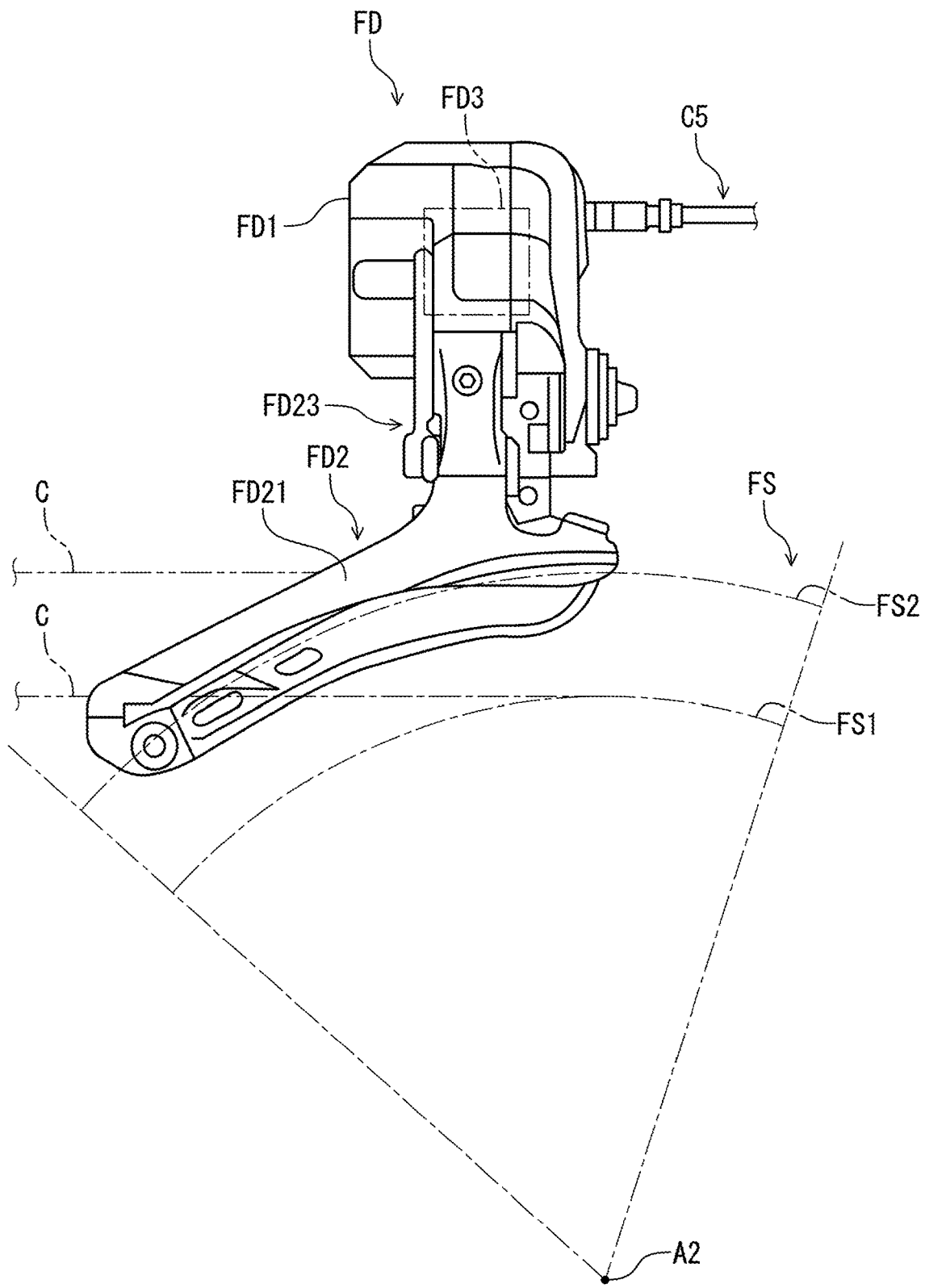
FIG. 9 is a side elevational view of an additional sprocket assembly and an additional gear shifting device of the human-powered vehicle illustrated in FIG. 1.

As seen in FIG. 9, the additional gear shifting device FD comprises a base member FD1, a chain guide FD2, and an actuator FD3. The base member FD1 is secured to the vehicle body 3 (FIG. 1). The chain guide FD2 is movably coupled to the base member FD1. The actuator FD3 is operatively coupled to the chain guide FD2 to move the chain guide FD2 relative to the base member FD1.

The chain guide FD2 includes a guide plate FD21 and a link structure FD23. The link structure FD23 movably couples the guide plate FD21 to the base member FD1. The actuator FD3 is coupled to the link structure FD23 to move the guide plate FD21 relative to the base member FD1.

Figure 10:
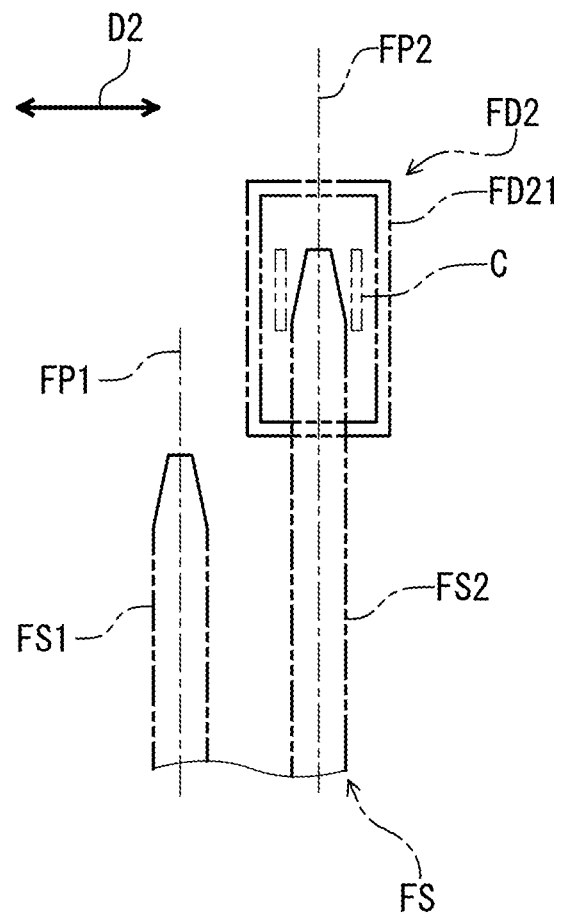
FIG. 10 is a partial rear schematic view of the additional sprocket assembly and the additional gear shifting device of the human-powered vehicle illustrated in FIG. 1.

In this embodiment, as seen in FIG. 10, the additional gear shifting device FD has a plurality of gear positions FP1 and FP2. The gear position FP1 corresponds to low gear, and the gear position FP11 corresponds to top gear. The actuator FD3 is operatively coupled to the chain guide FD2 to move the chain guide FD2 relative to the base member FD1 among the plurality of gear positions FP1 and FP2 and to stop the chain guide FD2 relative to the base member FD1 in any one of the plurality of gear positions FP1 and FP2. A total number of the gear positions is not limited to this embodiment.

In the present application, the term "gear position" can encompass a position of the chain guide FD2 relative to the base member FD1 and/or a sprocket corresponding to a position of the chain guide FD2.

As seen in FIG. 3, the shifting control device RD8 for the human-powered vehicle 10 comprises a controller CR10. The controller is configured to control the actuator RD3 of the gear shifting device RD to arrange the chain guide RD2 of the gear shifting device RD on the plurality of gear positions RP1 to RP11 (FIG. 8).

The controller CR10 is configured to receive the first upshift command OS11 from the operating device OD1. The controller CR10 is configured to receive the first downshift command OS12 from the operating device OD1. The controller CR10 is configured to receive the second upshift command OS21 from the operating device OD2. The controller CR10 is configured to receive the second downshift command OS22 from the operating device OD2.

The controller CR10 is configured to generate a rear upshift control command CC11 in response to the first upshift command OS11. The controller CR10 is configured to generate a rear downshift control command CC12 in response to the first downshift command OS12. The controller CR10 is configured to generate a front upshift control command CC21 in response to the second upshift command OS21. The controller CR10 is configured to generate a front downshift control command CC22 in response to the second downshift command OS22.

As seen in FIG. 3, the shifting control device RD8 includes a motor driver RD4 and a position sensor RD5. The motor driver RD4 is electrically connected to the actuator RD3 to control the actuator RD3 based on commands and/or signals from the controller CR10. Examples of the actuator RD3 include a direct-current (DC) motor and a stepper motor. The actuator RD3 includes a rotational shaft operatively coupled to the chain guide RD2. The position sensor RD5 is configured to sense a current gear position CRP of the gear shifting device RD. Examples of the position sensor RD5 include a potentiometer and a rotary encoder. The position sensor RD5 is configured to sense an absolute rotational position of the rotational shaft of the actuator RD3 as the current gear position CRP of the gear shifting device RD. The actuator RD3, the motor driver RD4, and the position sensor RD5 are electrically connected to each other with a bus RD6. The actuator RD3, the motor driver RD4, and the position sensor RD5 constitute a motor unit RD7.

The motor driver RD4 is configured to control the actuator RD3 to move the chain guide RD2 relative to the base member RD1 in the upshifting direction D41 based on the rear upshift control command CC11 and the current gear position CRP sensed by the position sensor RD5. The motor driver RD4 is configured to control the actuator RD3 to stop the chain guide RD2 relative to the base member RD1 based on the target-gear position TSP included in the rear upshift control command CC11 and the current gear position CRP sensed by the position sensor RD5.

The motor driver RD4 is configured to control the actuator RD3 to move the chain guide RD2 relative to the base member RD1 (FIG. 5) in the downshifting direction D42 (FIG. 6) based on the rear downshift control command CC12 and the current gear position CRP sensed by the position sensor RD5. The motor driver RD4 is configured to control the actuator RD3 to stop the chain guide RD2 relative to the base member RD1 (FIG. 5) based on the target-gear position TSP included in the rear downshift control command CC12 and the current gear position CRP sensed by the position sensor RD5.

As seen in FIG. 3, the additional gear shifting device FD includes a motor driver FD4 and a position sensor FD5. The motor driver FD4 is electrically connected to the actuator FD3 to control the actuator FD3 based on commands and/or signals from the controller CR10. Examples of the actuator FD3 include a DC motor and a stepper motor. The actuator FD3 includes a rotational shaft operatively coupled to the chain guide FD2. The position sensor FD5 is configured to sense a current gear position CFP of the additional gear shifting device FD. Examples of the position sensor FD5 include a potentiometer and a rotary encoder. The position sensor FD5 is configured to sense an absolute rotational position of the rotational shaft of the actuator FD3 as the current gear position CFP of the additional gear shifting device FD. The actuator FD3, the motor driver FD4, and the position sensor FD5 are electrically connected to each other with a bus FD6. The actuator FD3, the motor driver FD4, and the position sensor FD5 constitute a motor unit FD7.

The motor driver FD4 is configured to control the actuator FD3 to move the chain guide FD2 relative to the base member FD1 in the upshifting direction D41 based on the front upshift control command CC21 and the current gear position CFP sensed by the position sensor FD5. The motor driver FD4 is configured to control the actuator FD3 to stop the chain guide FD2 relative to the base member FD1 based on the target-gear position TSP included in the front upshift control command CC21 and the current gear position CFP sensed by the position sensor FD5.

The motor driver FD4 is configured to control the actuator FD3 to move the chain guide FD2 relative to the base member FD1 in the downshifting direction D42 based on the front downshift control command CC22 and the current gear position CFP sensed by the position sensor FD5.

In the illustrated embodiment, the controller CR10 is constituted as a microcomputer. The controller CR10 includes a processor CR11, a memory CR12, and a circuit board CR13. The processor CR11 includes a CPU and a memory controller. The memory CR12 is electrically connected to the processor CR11. The memory CR12 includes a ROM and a RAM. The ROM includes a non-transitory computer-readable storage medium. The RAM includes a transitory computer-readable storage medium. The memory CR12 includes storage areas each having an address in the ROM and the RAM. The processor CR11 controls the memory CR12 to store data in the storage areas of the memory CR12 and reads data from the storage areas of the memory CR12. For example, the memory CR12 is configured to store the current gear position CRP sensed by the position sensor RD5. The memory CR12 is also configured to store the current gear position CFP sensed by the position sensor FD5.

At least one program is stored in the memory CR12 (e.g., the ROM). The at least one program is read into the processor CR11, and thereby configurations of the controller CR10 are performed. The processor CR11 and the memory CR12 are mounted on the circuit board CR13 and are connected to each other with a bus CR14. Thus, the controller CR10 can also be referred to as a control circuit or circuitry CR10. The controller CR10 generates the rear upshift control command CC11, the rear downshift control command CC12, the front upshift control command CC21, and the front downshift control command CC22. The bus CR14 is connected to the bus RD6. The rear upshift control command CC11 and the rear downshift control command CC12 are transmitted from the controller CR10 to the motor driver RD4.

The memory CR12 is configured to store the current gear position. The controller CR10 is configured to select one of the upshifting direction D41 and the downshifting direction D42 based on the current gear position and the gear shift control command OS1. The memory CR12 is configured to store selected one of the upshifting direction D41 and the downshifting direction D42. The controller CR10 is configured to control the actuator RD3 to move the chain guide RD2 in the selected one of the upshifting direction D41 and the downshifting direction D42.

As seen in FIG. 2, the gear shifting device RD, the additional gear shifting device FD, the power supply PS, and the operating device OD communicate with each other via the electric communication path CP using power line communication (PLC) technology. More specifically, each of the electric cables C1 to C6 includes a ground line and a voltage line that are detachably connected to a serial bus that is formed by communication interfaces and the electric junctions J1 and J2. In this embodiment, the gear shifting device RD, the additional gear shifting device FD, the power supply PS, and the operating device OD can all communicate with each other through the voltage line using the PLC technology. As seen in FIG. 3, the front upshift control command CC21 and the front downshift control command CC22 are transmitted from the controller CR10 to the additional gear shifting device FD.

The PLC technology is used for communicating between electric components. The PLC carries data on a conductor that is also used simultaneously for electric power transmission or electric power distribution to the electric components. In this embodiment, electricity is supplied from the power supply PS to the gear shifting device RD, the additional gear shifting device FD, and the operating device OD via the electric communication path CP. Furthermore, the controller CR10 can receive information signals from the gear shifting device RD, the additional gear shifting device FD, the power supply PS, and the operating device OD via the electric communication path CP using the PLC.

As seen in FIG. 3, the PLC uses unique identifying information such as a unique identifier that is assigned to each of the gear shifting device RD, the additional gear shifting device FD, the power supply PS, the operating device OD1, and the operating device OD2. Each of the electric components RD, FD, PS, OD1, and OD2 includes a memory in which the unique identifying information is stored. Based on the unique identifying information, each of the electric components RD, FD, PS, OD1, and OD2 can recognize, based on the unique identifying information, information signals which are necessary for itself among information signals transmitted via the electric communication path CP. For example, the controller CR10 can recognize information signals transmitted from the gear shifting device RD, the additional gear shifting device FD, the power supply PS, the operating device OD1, and the operating device OD2 with the electric communication path CP. Instead of using the PLC technology, however, separate signal wires can be provided for transmitting data in addition to the ground wire and the voltage wire if needed and/or desired.

The controller CR10 includes an interface IF1. The interface IF1 is electrically connected to the processor CR11 and the memory CR12 with the bus CR14. The interface IF1 is electrically connected to the additional gear shifting device FD, the power supply PS, and the operating device OD to communicate with the additional gear shifting device FD, the power supply PS, and the operating device OD using the PLC. However, the interface IF1 can be configured to communicate with the additional gear shifting device FD, the power supply PS, and the operating device OD using another communication protocol.

The interface IF1 includes a circuit configured to transmit and receive a signal to and from other components via the electric communication path CP using the PLC. The interface IF1 is configured to separate input signals to the power source voltage and information signals. The interface IF1 is configured to regulate the power source voltage to a level at which various components of the controller CR10, the motor driver RD4, and the actuator RD3 can properly operate. The interface IF1 is configured to superimpose at least one of the front upshift control command CC21 and the front downshift control command CC22 to the power source voltage. The interface IF1 can be configured to superimpose at least one of the rear upshift control command CC11 and the rear downshift control command CC12 to the power source voltage.

The additional gear shifting device FD includes an interface IF2. The interface IF2 is electrically connected to the motor driver FD4 and the position sensor FD5 with the bus FD6. The interface IF2 is electrically connected to the gear shifting device RD and the operating device OD to communicate with the gear shifting device RD and the operating device OD using the PLC. However, the interface IF2 can be configured to communicate with the gear shifting device RD and the operating device OD using another communication protocol.

The operating device OD1 includes an interface IF3. The interface IF3 is electrically connected to the first upshift switch OD11, the first downshift switch OD12, and the first operation controller OD14 with the bus OD16. The interface IF3 is electrically connected to the gear shifting device RD and the additional gear shifting device FD to communicate with the gear shifting device RD and the additional gear shifting device FD using the PLC. However, the interface IF3 can be configured to communicate with the gear shifting device RD and the additional gear shifting device FD using another communication protocol.

The operating device OD2 includes an interface IF4. The interface IF4 is electrically connected to the second upshift switch OD21, the second downshift switch OD22, and the second operation controller OD24 with the bus OD26. The interface IF4 is electrically connected to the gear shifting device RD and the additional gear shifting device FD to communicate with the gear shifting device RD and the additional gear shifting device FD using the PLC. However, the interface IF4 can be configured to communicate with the gear shifting device RD and the additional gear shifting device FD using another communication protocol.

The power supply PS includes an interface IF5. The interface IF5 is electrically connected to the battery holder PS2. The interface IF5 is electrically connected to the operating device OS, the gear shifting device RD, and the additional gear shifting device FD to communicate with the operating device OD, the gear shifting device RD, and the additional gear shifting device FD using the PLC. However, the interface IF5 can be configured to communicate with the operating device OD, the gear shifting device RD, and the additional gear shifting device FD using another communication protocol.

The interfaces IF2, IF3, IF4, and IF5 have substantially the same configuration as that of the interface IF1. Thus, they will not be described in detail here for the sake of brevity.

Figure 11:
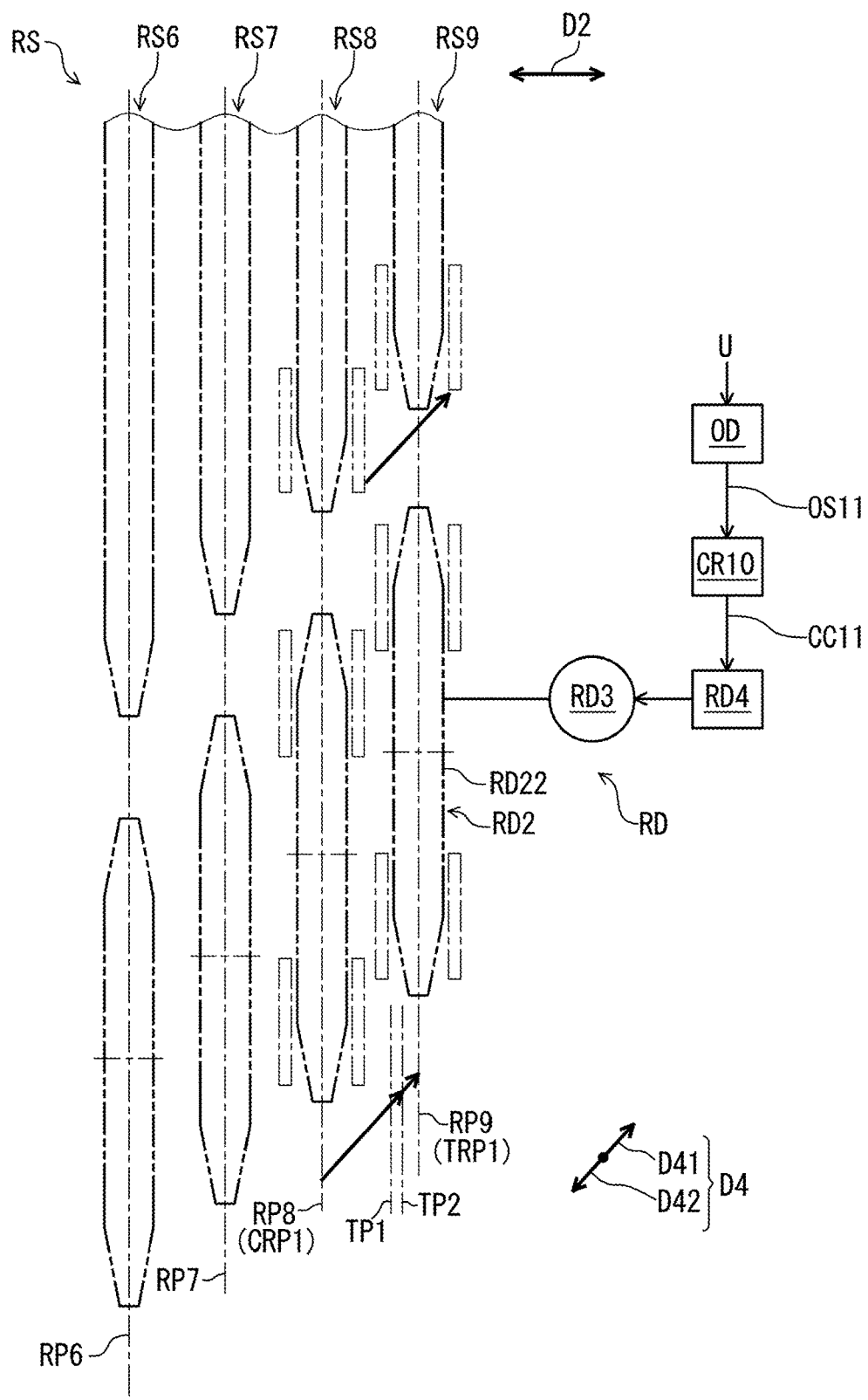
FIG. 11 is a partial schematic view of the sprocket assembly and the gear shifting device of the human-powered vehicle illustrated in FIG. 1 (upshift in a single gear shift operation).
Figure 12:
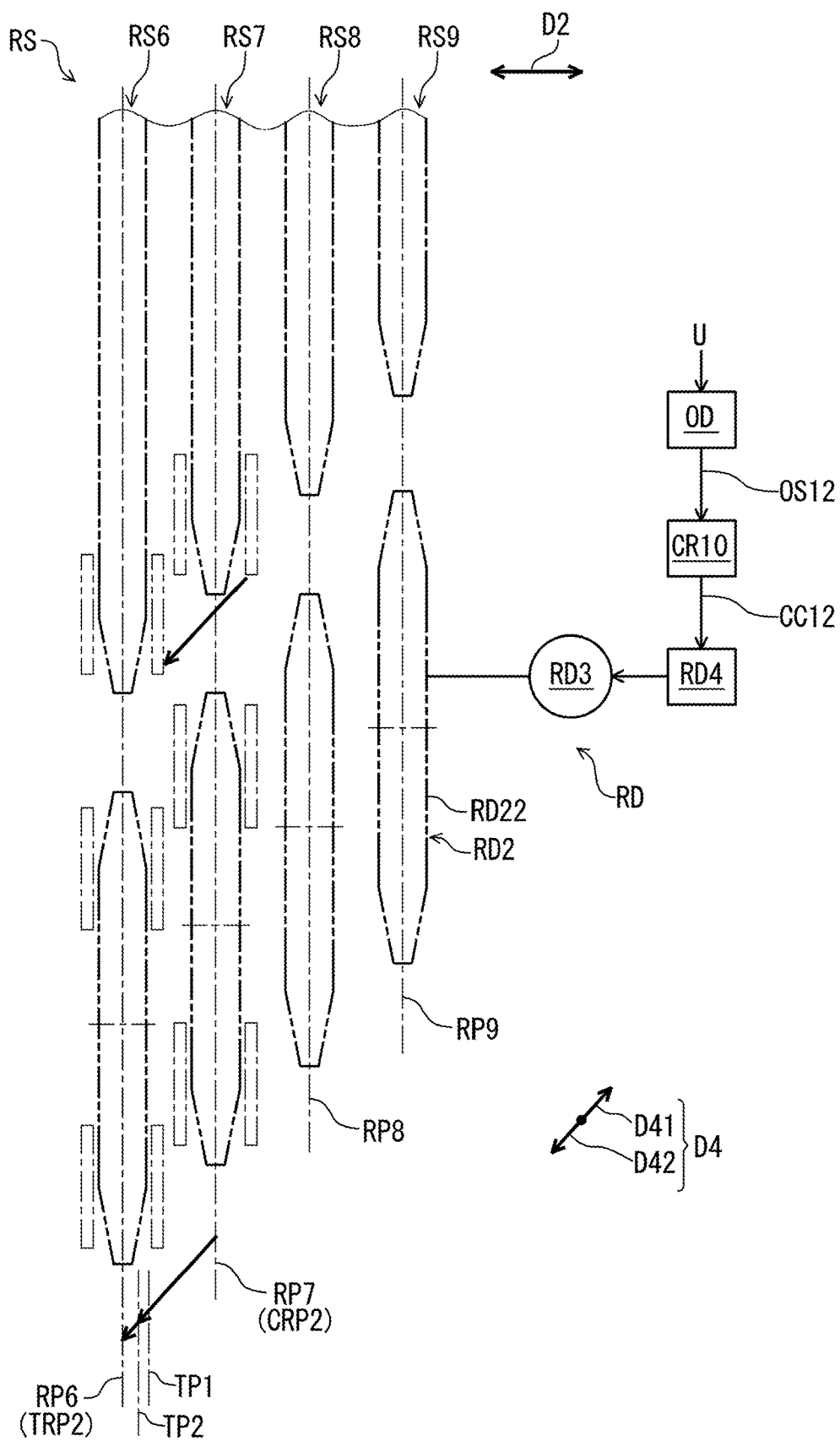
FIG. 12 is a partial schematic view of the sprocket assembly and the gear shifting device of the human-powered vehicle illustrated in FIG. 1 (downshift in a single gear shift operation).

As seen in FIGS. 11 and 12, the controller CR10 is configured to execute a single gear shift operation to accomplish a movement between two gear positions in the gear shift direction D4. The two gear positions are adjacent to each other in the gear shift direction D4 without another gear position between the two gear positions. The controller CR10 is configured to execute the single gear shift operation to accomplish the movement of the chain guide RD2 between two gear positions in the gear shift direction D4 in response to one of the first upshift command OS11 and the first downshift command OS12.

As seen in FIG. 11, the controller CR10 is configured to execute the single gear shift operation to accomplish the movement of the chain guide RD2 between two gear positions (e.g., the gear positions RP8 and RP9) in the upshifting direction D41 in response to the first upshift command OS11. As seen in FIG. 12, the controller CR10 is configured to execute the single gear shift operation to accomplish the movement between two gear positions (e.g., the gear positions RP6 and RP7) in the downshifting direction D42 in response to the first downshift command OS12.

Figure 13:
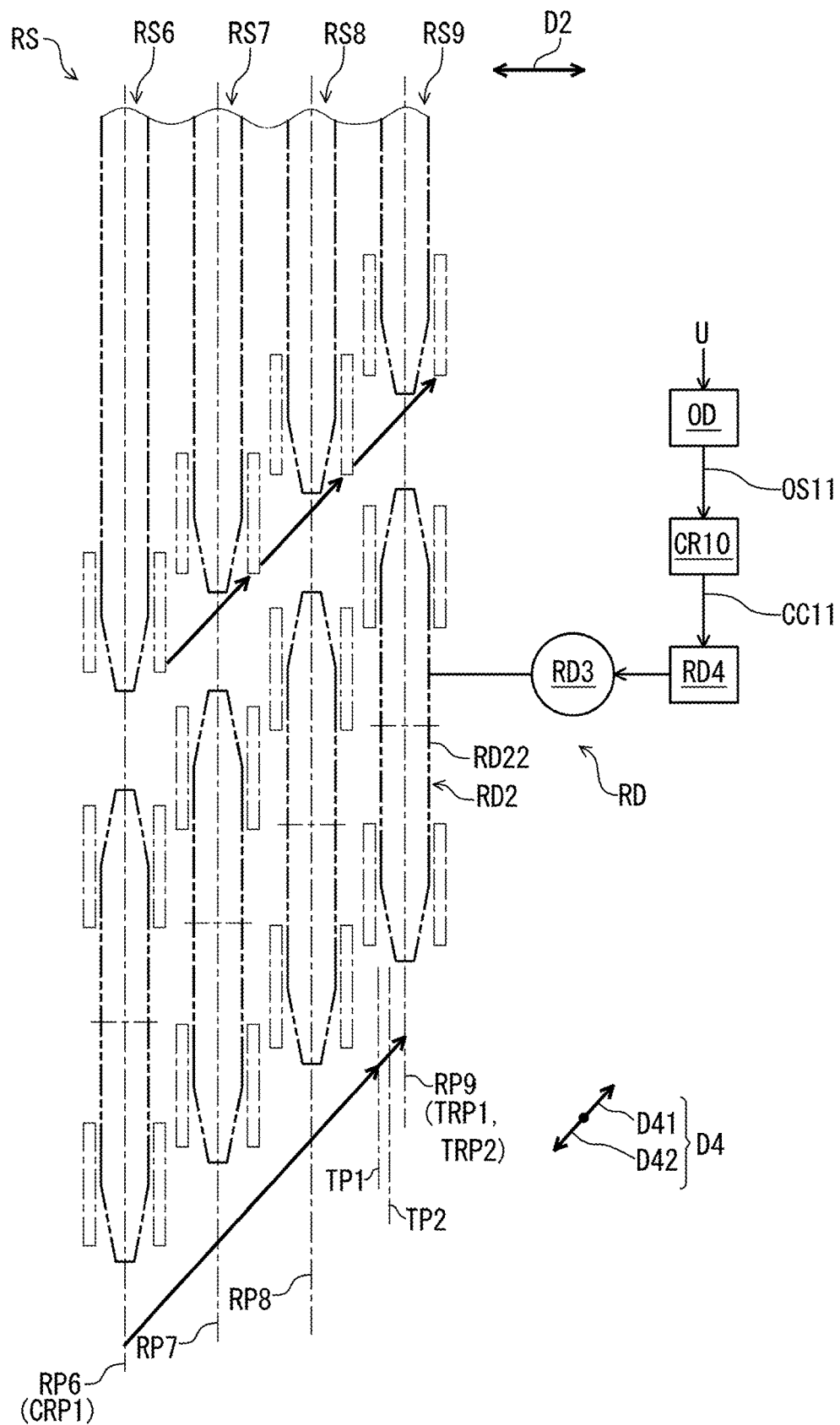
FIG. 13 is a partial schematic view of the sprocket assembly and the gear shifting device of the human-powered vehicle illustrated in FIG. 1 (upshift in a multistage gear shift operation).
Figure 14:
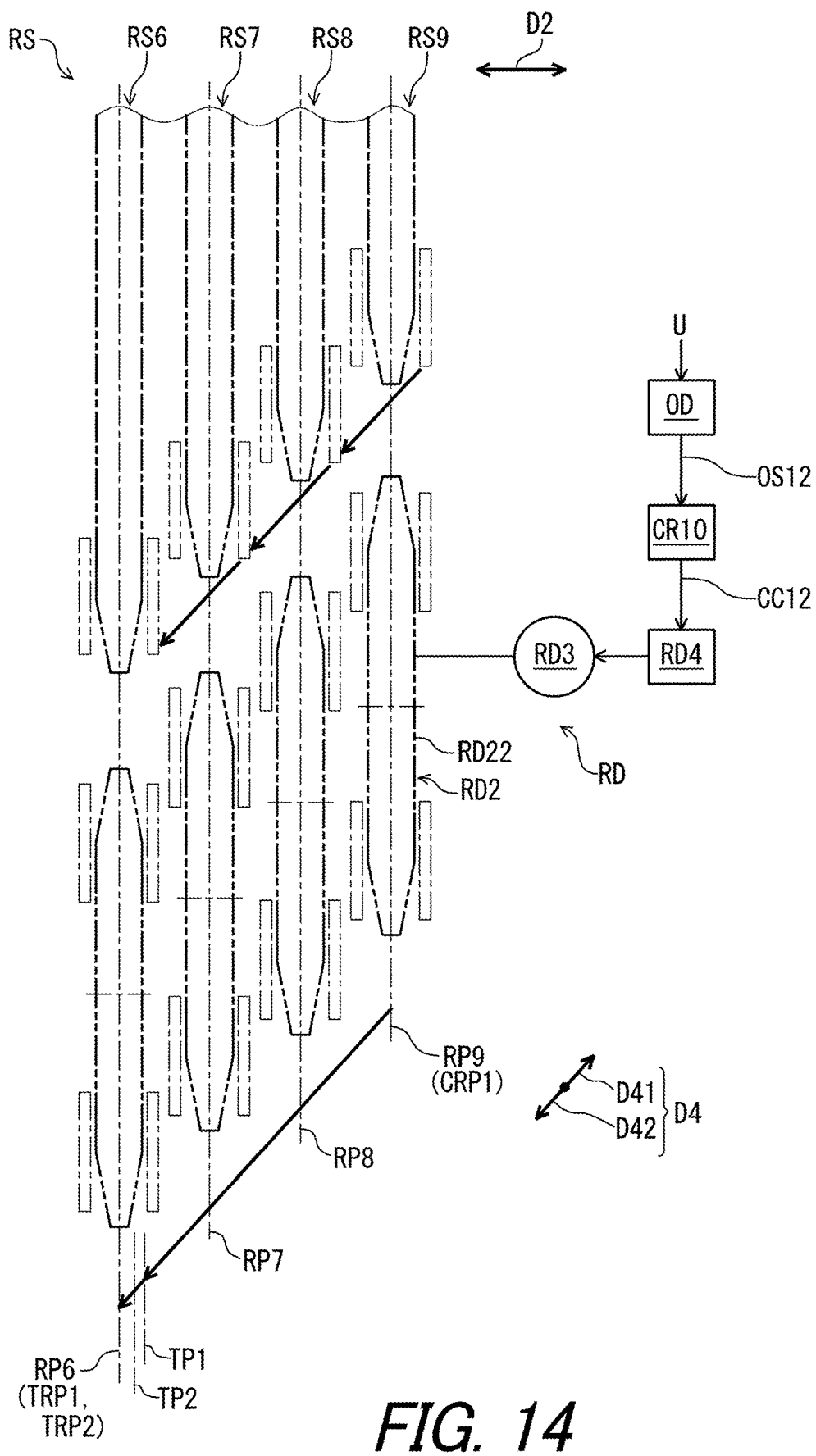
FIG. 14 is a partial schematic view of the sprocket assembly and the gear shifting device of the human-powered vehicle illustrated in FIG. 1 (downshift in a multistage gear shift operation).

As seen in FIGS. 13 and 14, the controller CR10 is configured to execute a multistage gear shift operation to accomplish a movement between at least three gear positions in the gear shift direction D4. The controller CR10 is configured to execute the multistage gear shift operation in response to the plurality of single gear shift control commands OS1 periodically transmitted from the operating device OD1 in response to the single user input U1.

As seen in FIG. 13, the controller CR10 is configured to execute the multistage gear shift operation to accomplish the movement of the chain guide RD2 between at least three gear positions (e.g., the gear positions RP6 to RP9) in the upshifting direction D41 in response to the plurality of first upshift commands OS11 periodically and continuously transmitted from the operating device OD1. As seen in FIG. 14, the controller CR10 is configured to execute the multistage gear shift operation to accomplish the movement of the chain guide RD2 between at least three gear positions (e.g., the gear positions RP6 to RP9) in the downshifting direction D42 in response to the plurality of first downshift commands OS12 periodically and continuously transmitted from the operating device OD1.

As seen in FIGS. 13 and 14, the controller CR10 is configured to control the actuator RD3 to move the chain guide RD2 from a first current gear position CRP1 to a first target gear position TRP1 in the gear shift direction D4 and to temporarily arrange the chain guide RD2 on a first temporary position TP1 in the multistage gear shift operation before stopping the chain guide RD2 at the first target gear position TRP1. In this embodiment, the first current gear position CRP1 is the current gear position CRP stored in the memory CR12 (FIG. 3) at the start of the multistage gear shift operation. Thus, the first current gear position CRP1 can also be referred to as a first start gear position CRP1.

As seen in FIGS. 13 and 14, the controller CR10 is configured to determine a termination of the plurality of single gear shift control commands OS1 (FIGS. 4 and 5) periodically transmitted from the operating device OD1 in response to the single user input U1. The controller CR10 is configured to control the actuator RD3 to temporarily arrange the chain guide RD2 on the first temporary position TP1 in the multistage gear shift operation in response to the termination of the plurality of single gear shift control commands OS1. In this embodiment, the controller CR10 is configured to control the actuator RD3 to temporarily stop the chain guide RD2 on the first temporary position TP1 in the multistage gear shift operation in response to the termination of the plurality of single gear shift control commands OS1. However, the controller CR10 can be configured to control the actuator RD3 to temporarily decrease a speed of the chain guide RD2 on the first temporary position TP1 in the multistage gear shift operation in response to the termination of the plurality of single gear shift control commands OS1.

As seen in FIG. 13, in this embodiment, the controller CR10 is configured to determine a termination of the plurality of first upshift commands OS11 (FIG. 4) periodically transmitted from the operating device OD1 in response to the single user input U11. The controller CR10 is configured to control the actuator RD3 to temporarily arrange the chain guide RD2 on the first temporary position TP1 in the multistage gear shift operation in response to the termination of the plurality of first upshift commands OS11. The controller CR10 is configured to control the actuator RD3 to temporarily stop the chain guide RD2 on the first temporary position TP1 in the multistage gear shift operation in response to the termination of the plurality of first upshift commands OS11. However, the controller CR10 can be configured to control the actuator RD3 to temporarily decrease a speed of the chain guide RD2 on the first temporary position TP1 in the multistage gear shift operation in response to the termination of the plurality of first upshift commands OS11.

As seen in FIG. 14, in this embodiment, the controller CR10 is configured to determine a termination of the plurality of first downshift commands OS12 (FIG. 5) periodically transmitted from the operating device OD1 in response to the single user input U1f. The controller CR10 is configured to control the actuator RD3 to temporarily arrange the chain guide RD2 on the first temporary position TP1 in the multistage gear shift operation in response to the termination of the plurality of first downshift commands OS12. The controller CR10 is configured to control the actuator RD3 to temporarily stop the chain guide RD2 on the first temporary position TP1 in the multistage gear shift operation in response to the termination of the plurality of first downshift commands OS12. However, the controller CR10 can be configured to control the actuator RD3 to temporarily decrease a speed of the chain guide RD2 on the first temporary position TP1 in the multistage gear shift operation in response to the termination of the plurality of first downshift commands OS12.

In the multistage gear shift operation, at least one gear position (two gear positions in FIGS. 13 and 14) is provided on a moving path from the first current gear position CRP1 to the first target gear position TRP1. In the multistage gear shift operation, the first target gear position TRP1 and the first temporary position TP1 are adjacent to each other in the gear shift direction D4 without another gear position between the first target gear position TRP1 and the first temporary position TP1.

In this embodiment, the controller CR10 is configured to control the actuator RD3 to move the chain guide RD2 from the first current gear position CRP1 to the first target gear position TRP1 in the gear shift direction D4 without temporarily stopping the chain guide RD2 in each gear position provided on the moving path. However, the controller CR10 can be configured to control the actuator RD3 to move the chain guide RD2 from the first current gear position CRP1 to the first target gear position TRP1 in the gear shift direction D4 with temporarily stopping the chain guide RD2 in each gear position providing on the moving path.

Figure 15:
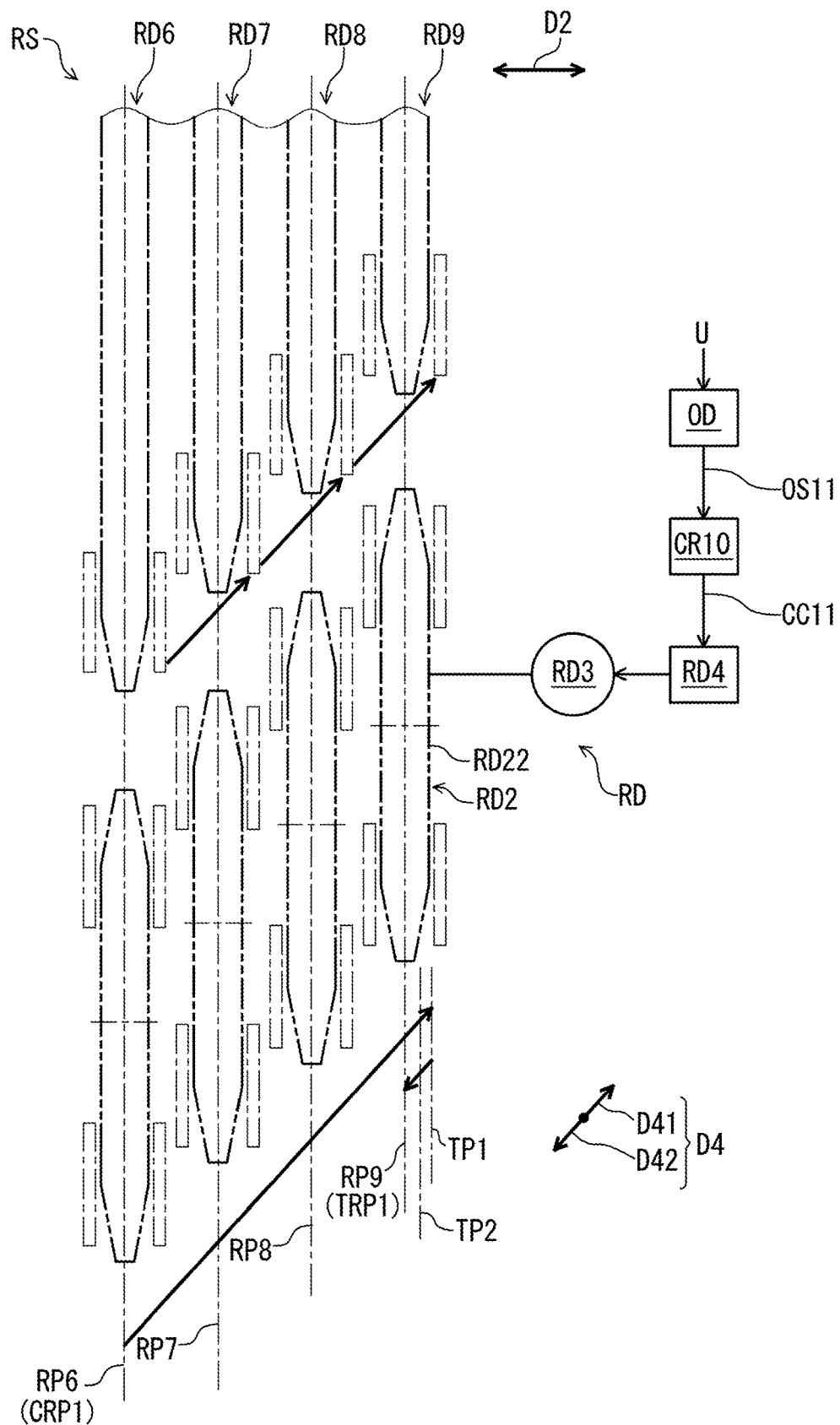
FIG. 15 is a partial schematic view of a sprocket assembly and a gear shifting device in accordance with a modification (upshift in a multistage gear shift operation).
Figure 16:
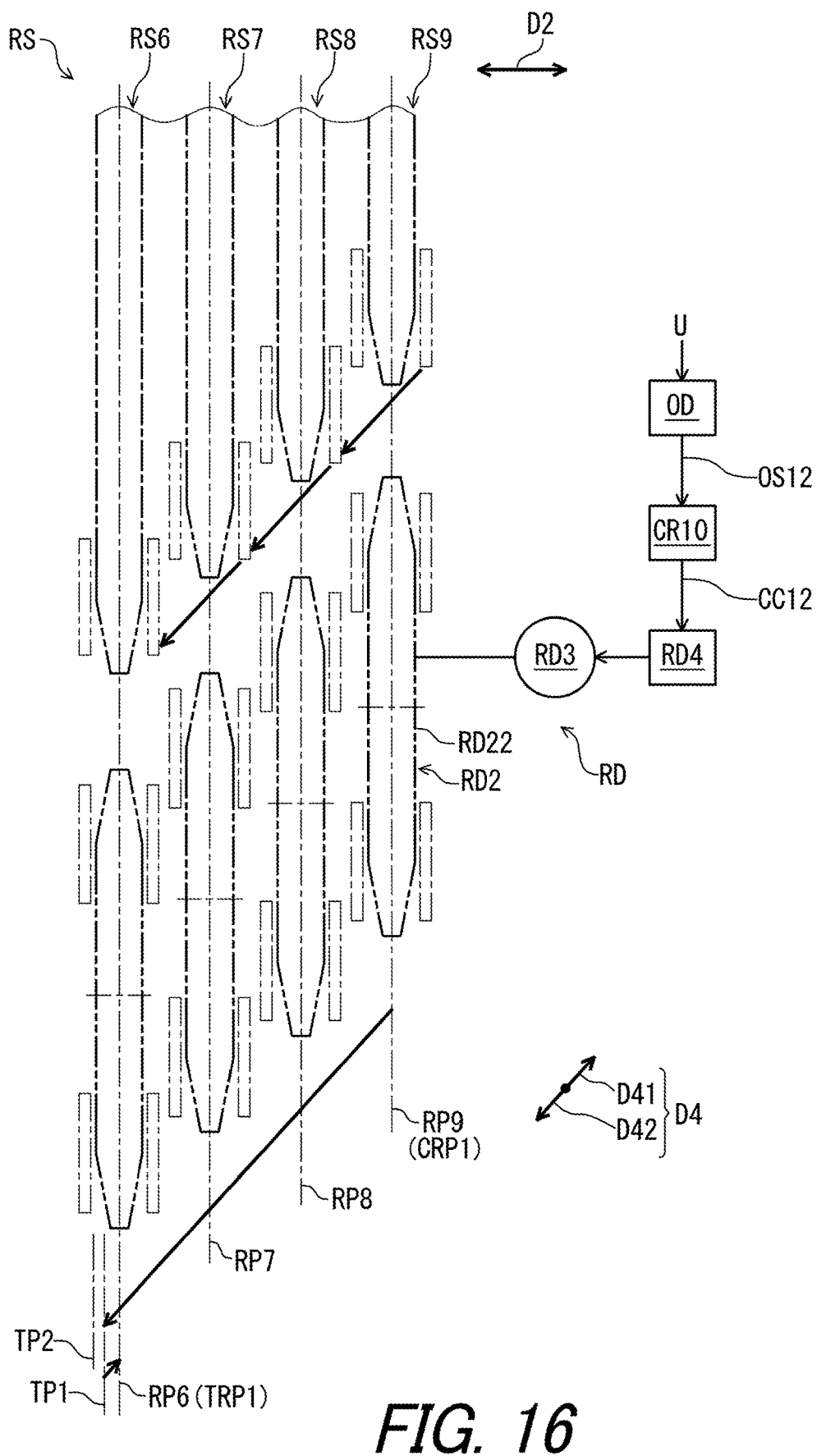
FIG. 16 is a partial schematic view of a sprocket assembly and a gear shifting device in accordance with a modification (downshift in a multistage gear shift operation).

As seen in FIGS. 13 and 14, the first temporary position TP1 is provided between the first current gear position CRP1 and the first target gear position TRP1. As seen in FIGS. 15 and 16, however, the first target gear position TRP1 can be provided between the first temporary position TP1 and the first current gear position CRP1.

As seen in FIGS. 11 and 12, the controller CR10 is configured to control the actuator RD3 to move the chain guide RD2 from a second current gear position CRP2 to a second target gear position TRP2 in the gear shift direction D4 and to temporarily arrange the chain guide RD2 on a second temporary position TP2 in the single gear shift operation before stopping the chain guide RD2 at the second target gear position TRP2.

As seen in FIG. 11, the controller CR10 is configured to control the actuator RD3 to move the chain guide RD2 from the second current gear position CRP2 to the second target gear position TRP2 in the upshifting direction D41 and to temporarily arrange the chain guide RD2 on the second temporary position TP2 in the single gear shift operation in response to the first upshift command OS11 before stopping the chain guide RD2 at the second target gear position TRP2. As seen in FIG. 12, the controller CR10 is configured to control the actuator RD3 to move the chain guide RD2 from the second current gear position CRP2 to the second target gear position TRP2 in the downshifting direction D42 and to temporarily arrange the chain guide RD2 on the second temporary position TP2 in the single gear shift operation in response to the first upshift command OS11 before stopping the chain guide RD2 at the second target gear position TRP2.

Figure 17:
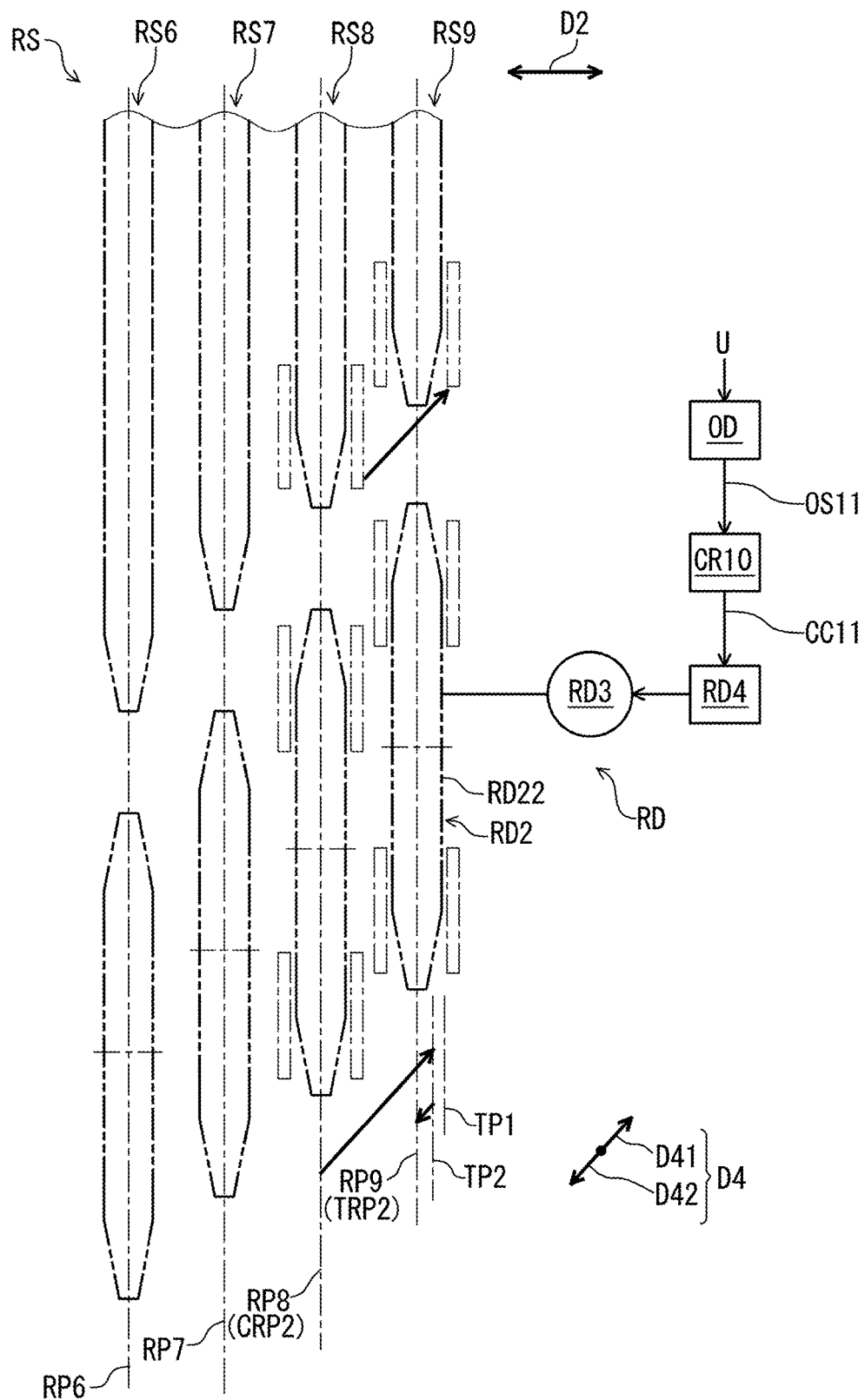
FIG. 17 is a partial schematic view of a sprocket assembly and a gear shifting device in accordance with a modification (upshift in a single gear shift operation).
Figure 18:
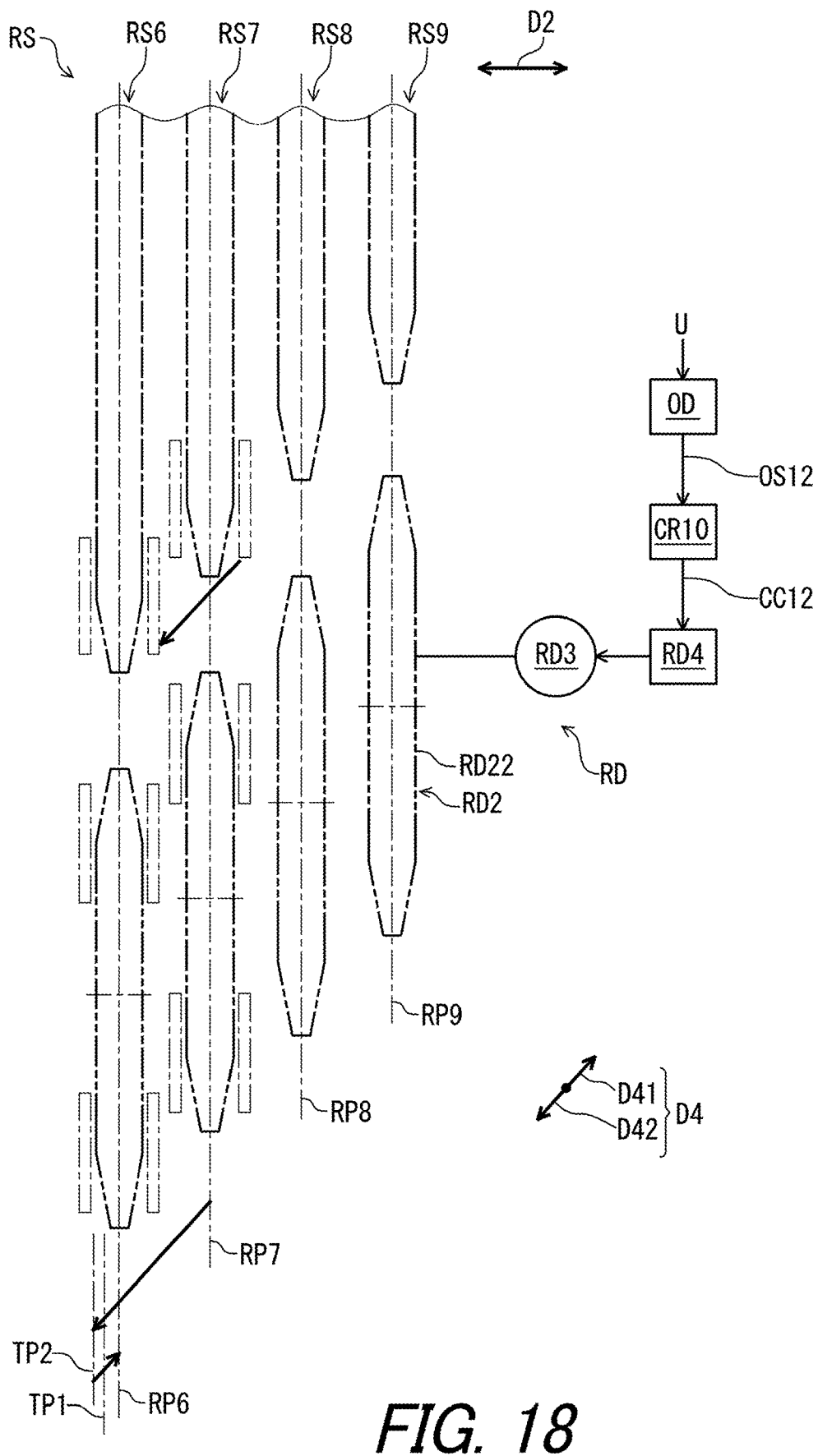
FIG. 18 is a partial schematic view of a sprocket assembly and a gear shifting device in accordance with a modification (downshift in a single gear shift operation).

As seen in FIGS. 11 and 12, the second temporary position TP2 is provided between the second current gear position CRP2 and the second target gear position TRP2. As seen in FIGS. 17 and 18, however, the second target gear position TRP2 can be provided between the second temporary position TP2 and the second current gear position CRP2.

As seen in FIGS. 11 and 12, in the single gear shift operation, the second current gear position CRP2 and the second target gear position TRP2 are adjacent to each other in the gear shift direction D4 without another gear position between the second current gear position CRP2 and the second target gear position TRP2. In the single gear shift operation, the second target gear position TRP2 and the second temporary position TP2 are adjacent to each other in the gear shift direction D4 without another gear position between the second target gear position TRP2 and the second temporary position TP2.

As seen in FIGS. 13 to 16, the first temporary position TP1 is offset from the second temporary position TP2 in the gear shift direction D4 if the first target gear position TRP1 and the second target gear position TRP2 correspond to the same gear position of the plurality of gear positions RP1 to RP11. In this embodiment, the second temporary position TP2 is closer to the first target gear position TRP1 than the first temporary position TP1 in the gear shift direction D4 if the first target gear position TRP1 and the second target gear position TRP2 correspond to the same gear position of the plurality of gear positions RP1 to RP11. However, the first temporary position TP1 can be closer to the first target gear position TRP1 than the second temporary position TP2 in the gear shift direction D4 if the first target gear position TRP1 and the second target gear position TRP2 correspond to the same gear position of the plurality of gear positions RP1 to RP11.

Figure 19:
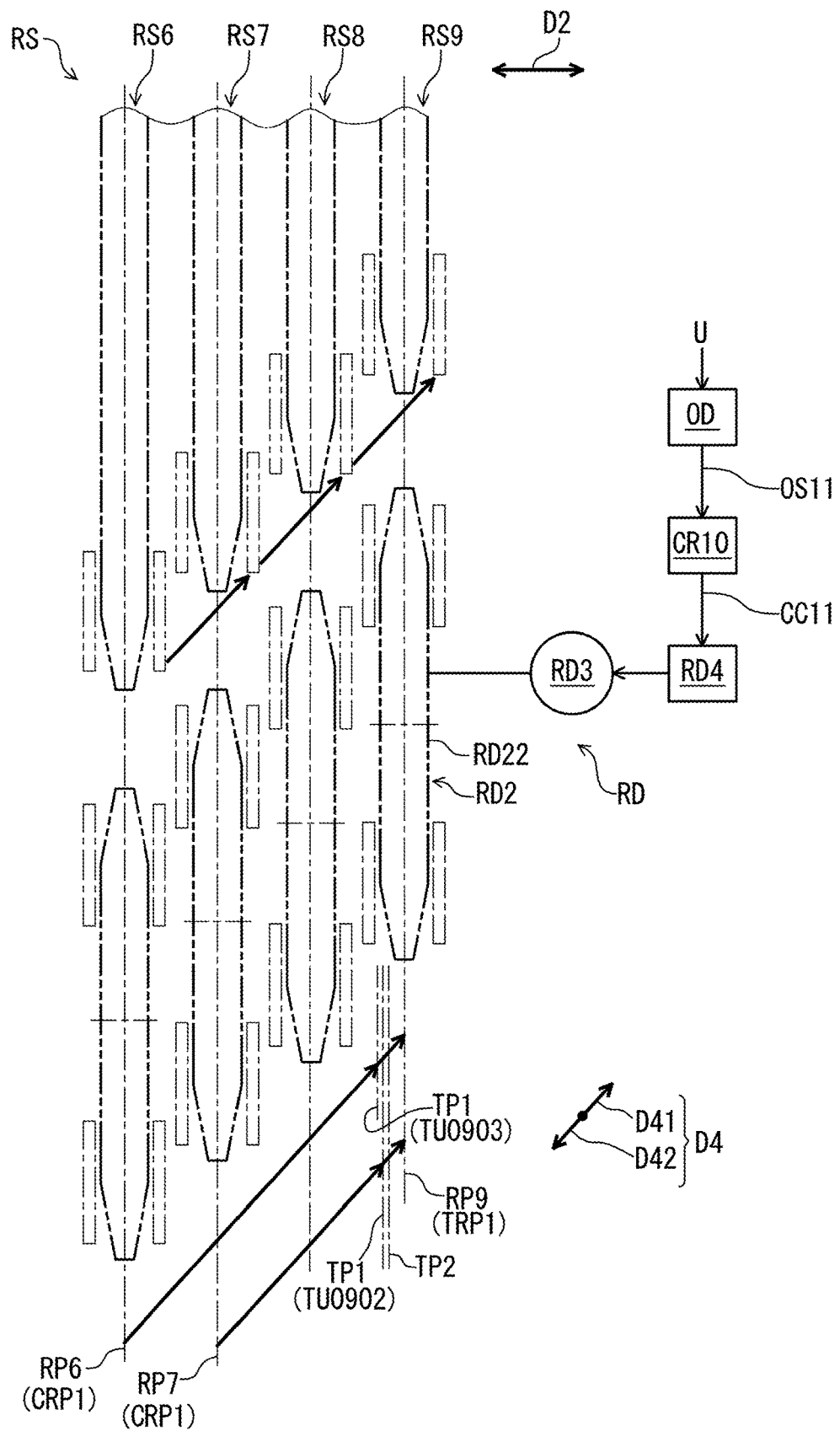
FIG. 19 is a partial schematic view of the sprocket assembly and the gear shifting device of the human-powered vehicle illustrated in FIG. 1 (upshift in the multistage gear shift operation by two stages or three stages).
Figure 20:
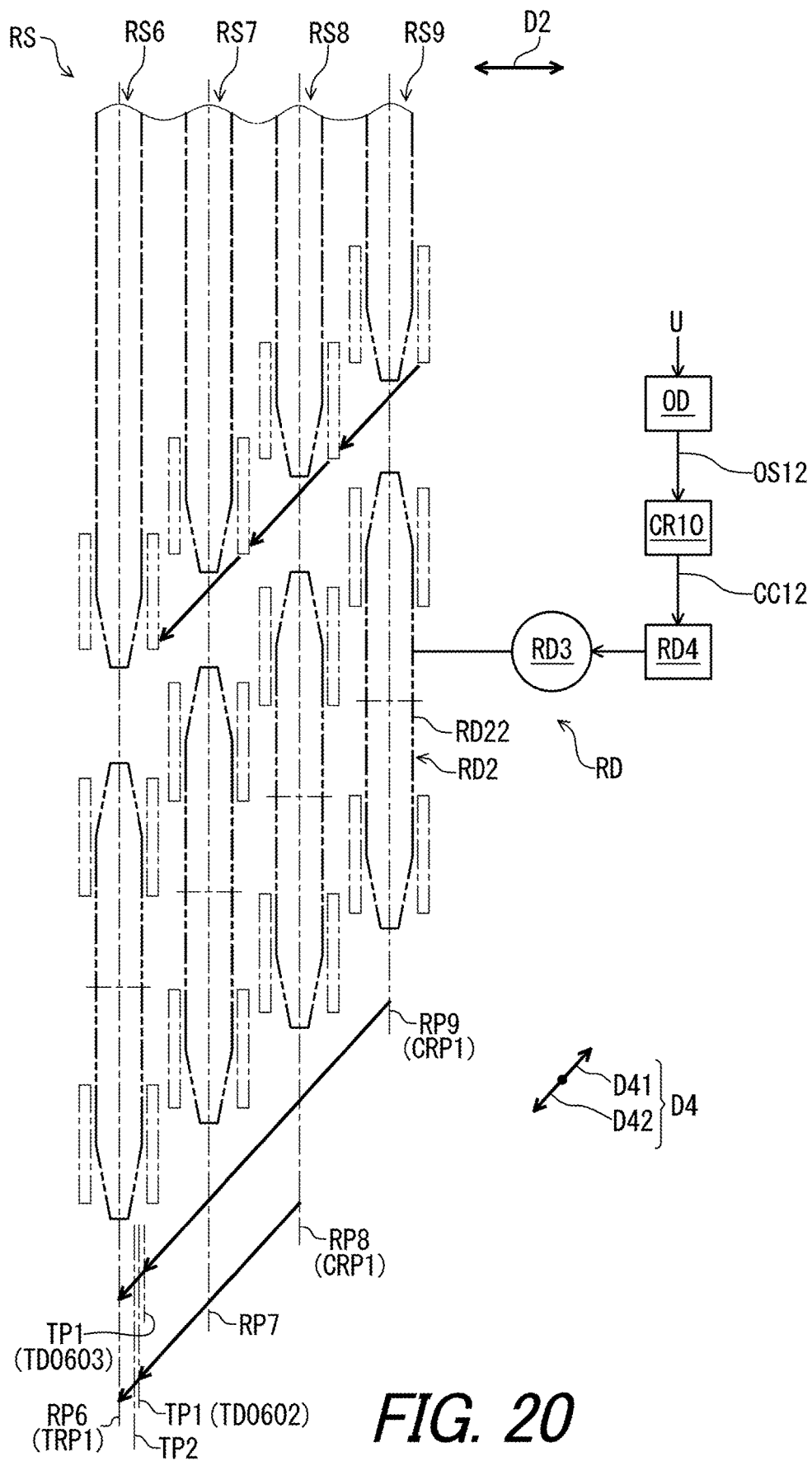
FIG. 20 is a partial schematic view of the sprocket assembly and the gear shifting device of the human-powered vehicle illustrated in FIG. 1 (downshift in the multistage gear shift operation by two stages or three stages).

As seen in FIGS. 19 and 20, the controller CR10 is configured to vary the first temporary position TP1 based on multistage-gear-shift information INF (FIGS. 21 and 22) relating to the multistage gear shift operation. As seen in FIGS. 21 and 22, the memory (FIG. 3) is configured to store the plurality of gear positions RP1 to RP11 and the multistage-gear-shift information INF. The multistage-gear-shift information INF includes a plurality of available temporary positions. The plurality of available temporary positions is partly different from each other.

In this embodiment, as seen in FIG. 21, the plurality of available temporary positions includes an available temporary position TU0302 corresponding to the gear position RP3, available temporary positions TU0402 and TU0403 corresponding to the gear position RP4, available temporary positions TU0502 to TU0504 corresponding to the gear position RP5, available temporary positions TU0602 to TU0605 corresponding to the gear position RP6, available temporary positions TU0702 to TU0706 corresponding to the gear position RP7, available temporary positions TU0802 to TU0807 corresponding to the gear position RP8, available temporary positions TU0902 to TU0908 corresponding to the gear position RP9, available temporary positions TU1002 to TU1009 corresponding to the gear position RP10, and available temporary positions TU1102 to TU1110 corresponding to the gear position RP11.

The available temporary positions TU0402 and TU0403 are different from each other. The available temporary positions TU0502 to TU0504 are different from each other. The available temporary positions TU0602 to TU0605 are different from each other. The available temporary positions TU0702 to TU0706 are different from each other. The available temporary positions TU0802 to TU0807 are different from each other. The available temporary positions TU0902 to TU0908 are different from each other. The available temporary positions TU1002 to TU1009 are different from each other. The available temporary positions TU1102 to TU1110 are different from each other.

In this embodiment, as seen in FIG. 22, the plurality of available temporary positions includes available temporary positions TD0102 to TD0110 corresponding to the gear position RP1, available temporary positions TD0202 to TD0209 corresponding to the gear position RP2, available temporary positions TD0302 to TD0308 corresponding to the gear position RP3, available temporary positions TD0402 to TD0407 corresponding to the gear position RP4, available temporary positions TD0502 to TD0506 corresponding to the gear position RP5, available temporary positions TD0602 to TD0605 corresponding to the gear position RP6, available temporary positions TD0702 to TD0704 corresponding to the gear position RP7, available temporary positions TD0802 and TD0803 corresponding to the gear position RP8, and an available temporary position TD0902 corresponding to the gear position RP9.

The available temporary positions TD0102 to TD0110 are different from each other. The available temporary positions TD0202 to TD0209 are different from each other. The available temporary positions TD0302 to TD0308 are different from each other. The available temporary positions TD0402 to TD0407 are different from each other. The available temporary positions TD0502 to TD0506 are different from each other. The available temporary positions TD0602 to TD0605 are different from each other. The available temporary positions TD0702 to TD0704 are different from each other. The available temporary positions TD0802 and TD0803 are different from each other.

The controller CR10 (FIG. 3) is configured to select one temporary position from the plurality of available temporary positions to vary the first temporary position TP1. The controller CR10 (FIG. 3) is configured to select one temporary position from the plurality of available temporary positions to vary the first temporary position TP1 based on multistage-gear-shift information INF. The controller CR10 is configured to store the selected available temporary position as the first temporary position TP1 based on multistage-gear-shift information INF.

As seen in FIGS. 21 and 22, the multistage-gear-shift information INF includes the gear shift direction D4. The controller CR10 is configured to select one temporary position from the plurality of available temporary positions to vary the first temporary position TP1 based on the gear shift direction D4. The controller CR10 is configured to select one temporary position from the plurality of available temporary positions to vary the first temporary position TP1 based on selected one of the upshifting direction D41 and the downshifting direction D42.

The multistage-gear-shift information INF includes a total number N of the plurality of single gear shift control commands OS1 periodically transmitted from the operating device OD1 in response to the single user input U1. The controller CR10 is configured to select one temporary position from the plurality of available temporary positions to vary the first temporary position TP1 based on the total number N of the plurality of single gear shift control commands OS1. The controller CR10 is configured to count the total number N of the plurality of single gear shift control commands OS1. The controller CR10 is configured to select the first target gear position TRP1 from the plurality of gear positions based on the first current gear position CRP1 and the total number N of the plurality of single gear shift control commands OS1.

The multistage-gear-shift information INF includes the first current gear position CRP1. The controller CR10 is configured to select one temporary position from the plurality of available temporary positions to vary the first temporary position TP1 based on the first current gear position CRP1. The multistage-gear-shift information INF includes the first target gear position TRP1. The controller CR10 is configured to select one temporary position from the plurality of available temporary positions to vary the first temporary position TP1 based on the first target gear position TRP1. The controller CR10 is configured to determine the first target gear position TRP1 based on the first current gear position CRP1 and the total number N of the single gear shift control commands OS1 periodically transmitted from the operating device OD1 in response to the single user input U1.

As seen in FIGS. 19 and 21, for example, the controller CR10 is configured to conclude that the first target gear position TRP1 is the gear position RP9 and to select the available temporary position TU0903 if the gear shift direction D4 is the upshifting direction D41, the first current gear position CRP1 is the gear position RP6, and the total number of the single gear shift control commands is three. The controller CR10 is configured to conclude that the first target gear position TRP1 is the gear position RP9 and to select the available temporary position TU0902 if the gear shift direction D4 is the upshifting direction D41, the first current gear position CRP1 is the gear position RP7, and the total number of the single gear shift control commands is two.

As seen in FIGS. 20 and 22, the controller CR10 is configured to conclude that the first target gear position TRP1 is the gear position RP6 and to select the available temporary position TD0603 if the gear shift direction D4 is the downshifting direction D42, the first current gear position CRP1 is the gear position RP9, and the total number of the single gear shift control commands is three. The controller CR10 is configured to conclude that the first target gear position TRP1 is the gear position RP6 and to select the available temporary position TD0602 if the gear shift direction D4 is the downshifting direction D42, the first current gear position CRP1 is the gear position RP8, and the total number of the single gear shift control commands is two.

As seen in FIGS. 21 and 22, the controller CR10 is configured to execute the single gear shift operation based on single-gear-shift information relating to the single gear shift operation. The single-gear-shift information includes a plurality of available temporary positions different from each other. The plurality of available temporary positions includes an available temporary position TD0101 corresponding to the gear position RP1, available temporary positions TU0201 and TD0201 corresponding to the gear position RP2, available temporary positions TU0301 and TD0301 corresponding to the gear position RP3, available temporary positions TU0401 and TD0401 corresponding to the gear position RP4, available temporary positions TU0501 and TD0501 corresponding to the gear position RP5, available temporary positions TU0601 and TD0601 corresponding to the gear position RP6, available temporary positions TU0701 and TD0701 corresponding to the gear position RP7, available temporary positions TU0801 and TD0801 corresponding to the gear position RP8, available temporary positions TU0901 and TD0901 corresponding to the gear position RP9, available temporary positions TU1001 and TD1001 corresponding to the gear position RP10, and an available temporary position TU101 corresponding to the gear position RP11.

The control algorithm of the gear shifting device RD will be described in detail below referring to FIGS. 23 to 26.

Figure 23:
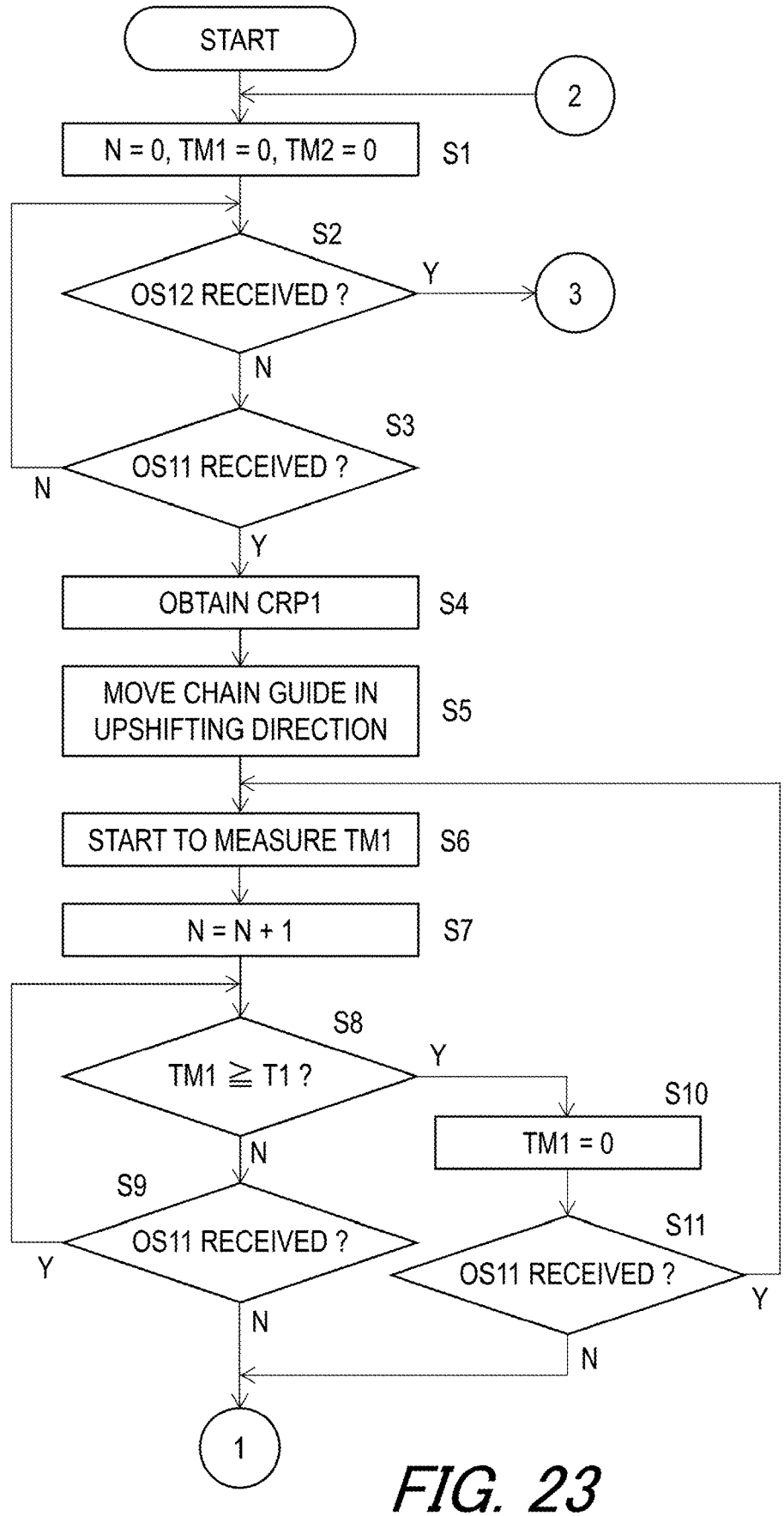
FIGS. 23 to 26 are flow charts showing an operation of the shift control device of the human-powered vehicle illustrated in FIG. 1.

As seen in FIG. 23, the controller CR10 resets the total number N of the single gear shift control commands OS1 (the total number N of the first upshift commands OS11), a determination time TM1, and a determination time TM2 (Step S1). The controller CR10 is configured to measure each of the determination time TM1 and the determination time TM2. The controller CR10 determines whether the controller CR10 receives one of the first upshift command PS11 and the first downshift command OS12 (Steps S2 and S3). The controller CR10 obtains the first current gear position CRP1 if the controller CR10 receives the first upshift command OS11 (Steps S3 and S4). The controller CR10 controls the actuator RD3 to move the chain guide RD2 in the upshifting direction D41 (Step S5). The controller CR10 starts to measure the determination time TM1 and increments the total number N of the first upshift commands OS11 by one (Steps S6 and S7).

The controller CR10 determines whether the determination time TM1 is equal to or longer than a threshold time T1 (Step S8). The controller CR10 determines whether the controller CR10 still receives the first upshift command OS11 if the determination time TM1 is shorter than the threshold time T1 (Steps S8 and S9). The Steps S8 and S9 are repeated if the determination time TM1 is shorter than the threshold time T1 and the controller CR10 still receives the first upshift command OS11.

If the determination time TM1 is equal to or longer than the threshold time T1, the controller CR10 resets the determination time TM1 and determines whether the controller CR10 still receives the first upshift command OS11 (Steps S8, S10, and S11). The process enters the Step S6 if the controller CR10 still receives the first upshift command OS11 (Step S11).

Figure 24:
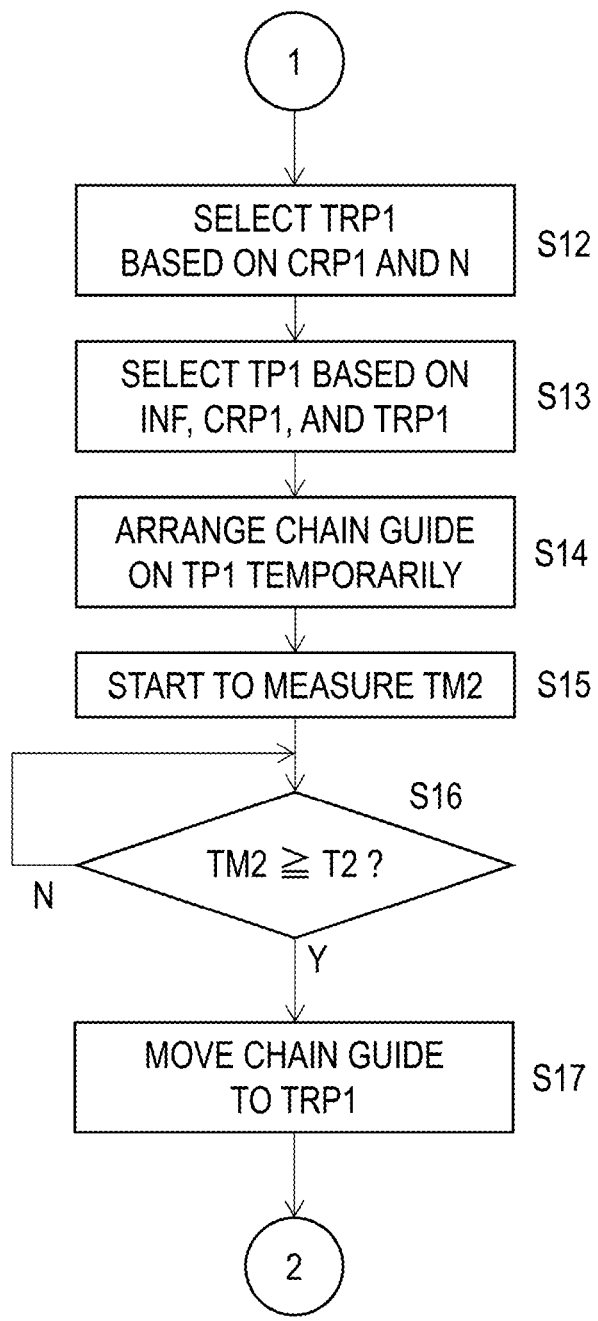

As seen in FIG. 24, the process enters Step S12 if the controller CR10 does not receive the first upshift command OS11 (Steps S9, S11, and S12). The controller CR10 selects the first target gear position TRP1 based on the first current gear position CRP1 and the total number N of the first upshift commands OS11 (Step S12). In this embodiment, the controller CR10 selects the first target gear position TRP1 from among the gear positions RP1 to RP11 based on the first current gear position CRP1 and the total number N of the first upshift commands OS11. For example, as seen in FIG. 21, the controller CR10 selects the gear position RP9 as the first target gear position TRP1 if the first current gear position CRP1 is the gear position RP6 and the total number N is three. The controller CR10 selects the gear position RP9 as the first target gear position TRP1 if the first current gear position CRP1 is the gear position RP7 and the total number N is two.

As seen in FIG. 24, the controller CR10 selects the temporary position TP1 based on the multistage-gear-shift information INF, the first current gear position CRP1, and the first target gear position TRP1 (Step S13). In this embodiment, the controller CR10 selects the temporary position TP1 from among the plurality of available temporary positions based on the multistage-gear-shift information INF, the first current gear position CRP1, and the first target gear position TRP1. For example, as seen in FIG. 21, the controller CR10 selects the available temporary position TU0903 as the temporary position TP1 if the first current gear position CRP1 is the gear position RP6 and the first target gear position TRP1 is the gear position RP9. The controller CR10 selects the available temporary position TU0902 as the temporary position TP1 if the first current gear position CRP1 is the gear position RP7 and the first target gear position TRP1 is the gear position RP9. However, the controller CR10 can be configured to directly select the temporary position TR1 from among the plurality of available temporary positions based on the multistage-gear-shift information INF, the first current gear position CRP1, and the total number N.

As seen in FIG. 24, the controller CR10 controls the actuator RD3 to temporarily arrange the chain guide RD2 on the selected temporary position TP1 after selecting the temporary position TP1 (Step S14). In this embodiment, the controller CR10 controls the actuator RD3 to temporarily stop the chain guide RD2 on the selected temporary position TP1. For example, as seen in FIG. 19, the controller CR10 controls the actuator RD3 to temporarily stop the chain guide RD2 on the temporary position TP1 (TU0903) if the controller CR10 selects the available temporary position TU0903 as the temporary position TP1. The controller CR10 controls the actuator RD3 to temporarily stop the chain guide RD2 on the temporary position TP1 (TU0902) if the controller CR10 selects the available temporary position TU0902 as the temporary position TP1. However, the controller CR10 can be configured to control the actuator RD3 to temporarily reduce the speed of the chain guide RD2 on the selected temporary position TP1.

As seen in FIG. 24, the controller CR10 starts to measure the determination time TM2 after arranging the chain guide RD2 on the temporary position TP1 (Step S15). The controller CR10 controls the actuator RD3 to move the chain guide RD2 to the first target gear position TRP1 and to stop the chain guide RD2 at the first target gear position TRP1 if the determination time TM2 is equal to or longer than a threshold time T2 (Steps S16 and S17). Namely, the controller CR10 controls the actuator RD3 to stop the chain guide RD2 on the temporary position TP1 for a time period corresponding to the threshold time T2. Thus, it is possible to reduce shock during the multistate gear shift operation. The process enters the Step S1 after the chain guide RD2 is moved to the first target gear position TRP1.

Figure 25:
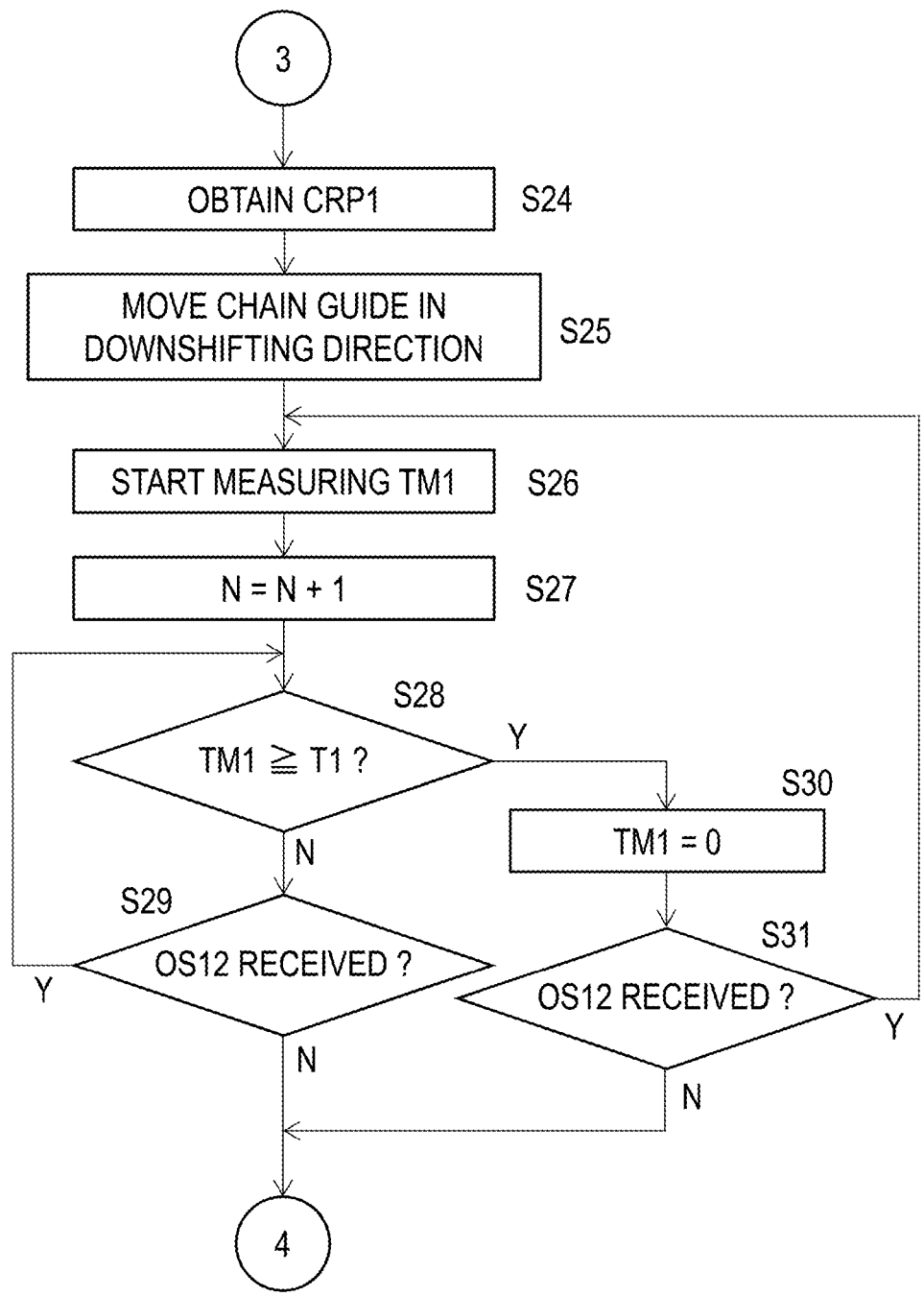

As seen in FIGS. 23 and 25, the controller CR10 obtains the first current gear position CRP1 if the controller CR10 receives the first downshift command OS12 (Steps S3 and S24). The controller CR10 controls the actuator RD3 to move the chain guide RD2 in the downshifting direction D42 (Step S25). The controller CR10 starts to measure the determination time TM1 and increments the total number N of the first downshift commands OS12 by one (Steps S26 and S27).

The controller CR10 determines whether the determination time TM1 is equal to or longer than the threshold time T1 (Step S28). The controller CR10 determines whether the controller CR10 still receives the first downshift command OS12 if the determination time TM1 is shorter than the threshold time T1 (Steps S28 and S29). The Steps S28 and S29 are repeated if the determination time TM1 is shorter than the threshold time T1 and the controller CR10 still receives the first downshift command OS12.

If the determination time TM1 is equal to or longer than the threshold time T1, the controller CR10 resets the determination time TM1 and determines whether the controller CR10 still receives the first downshift command OS12 (Steps S28, S30, and S31). The process enters the Step S26 if the controller CR10 still receives the first downshift command OS12 (Step S31).

Figure 26:
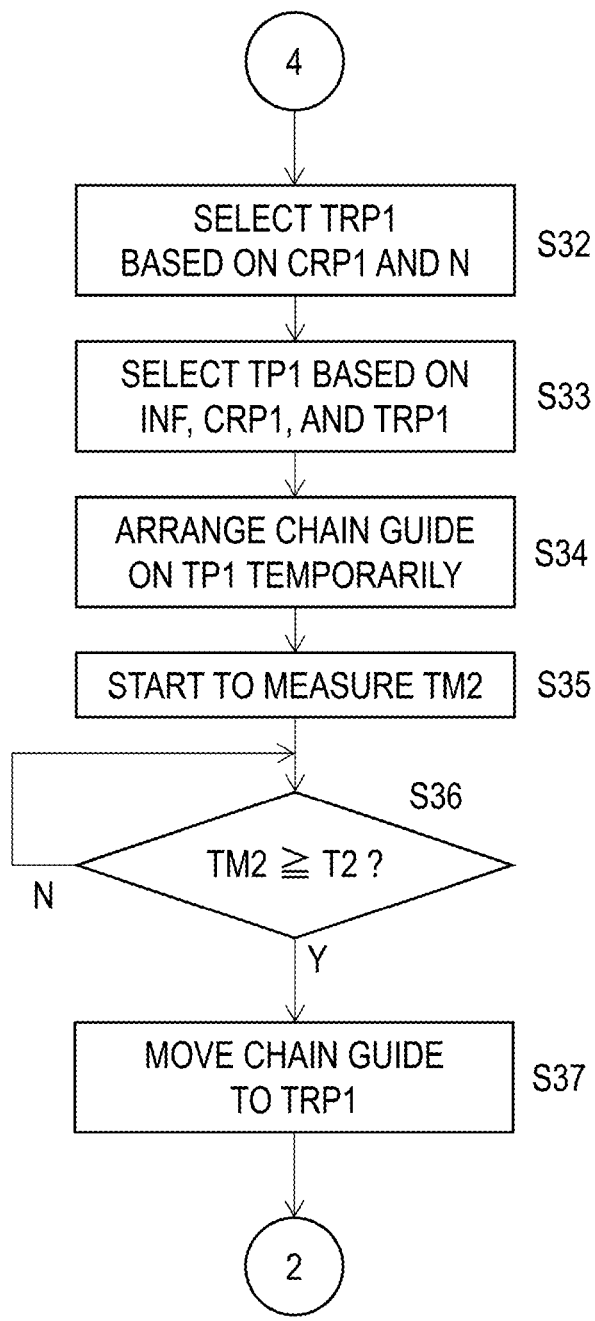

As seen in FIG. 26, the process enters Step S12 if the controller CR10 does not receive the first downshift command OS12 (Steps S29, S31, and S32). The controller CR10 selects the first target gear position TRP1 based on the first current gear position CRP1 and the total number N of the first downshift commands OS12 (Step S32). In this embodiment, the controller CR10 selects the first target gear position TRP1 from among the gear positions RP1 to RP11 based on the first current gear position CRP1 and the total number N of the first downshift commands OS12. For example, as seen in FIG. 22, the controller CR10 selects the gear position RP6 as the first target gear position TRP1 if the first current gear position CRP1 is the gear position RP9 and the total number N is three. The controller CR10 selects the gear position RP7 as the first target gear position TRP1 if the first current gear position CRP1 is the gear position RP9 and the total number N is two.

As seen in FIG. 26, the controller CR10 selects the temporary position TP1 based on the multistage-gear-shift information INF, the first current gear position CRP1, and the first target gear position TRP1 (Step S33). In this embodiment, the controller CR10 selects the temporary position TP1 from among the plurality of available temporary positions based on the multistage-gear-shift information INF, the first current gear position CRP1, and the first target gear position TRP1. For example, as seen in FIG. 22, the controller CR10 selects the available temporary position TD0603 as the temporary position TP1 if the first current gear position CRP1 is the gear position RP9 and the first target gear position TRP1 is the gear position RP6. The controller CR10 selects the available temporary position TD0602 as the temporary position TP1 if the first current gear position CRP1 is the gear position RP8 and the first target gear position TRP1 is the gear position RP6. However, the controller CR10 can be configured to directly select the temporary position TR1 from among the plurality of available temporary positions based on the multistage-gear-shift information INF, the first current gear position CRP1, and the total number N.

As seen in FIG. 26, the controller CR10 controls the actuator RD3 to temporarily arrange the chain guide RD2 on the selected temporary position TP1 after selecting the temporary position TP1 (Step S34). In this embodiment, the controller CR10 controls the actuator RD3 to temporarily stop the chain guide RD2 on the selected temporary position TP1. For example, as seen in FIG. 20, the controller CR10 controls the actuator RD3 to temporarily stop the chain guide RD2 on the temporary position TP1 (TD0603) if the controller CR10 selects the available temporary position TD0603 as the temporary position TP1. The controller CR10 controls the actuator RD3 to temporarily stop the chain guide RD2 on the temporary position TP1 (TD0602) if the controller CR10 selects the available temporary position TD0602 as the temporary position TP1. However, the controller CR10 can be configured to control the actuator RD3 to temporarily reduce the speed of the chain guide RD2 on the selected temporary position TP1.

As seen in FIG. 26, the controller CR10 starts to measure the determination time TM2 after arranging the chain guide RD2 on the temporary position TP1 (Step S35). The controller CR10 controls the actuator RD3 to move the chain guide RD2 to the first target gear position TRP1 and to stop the chain guide RD2 at the first target gear position TRP1 if the determination time TM2 is equal to or longer than a threshold time T2 (Steps S36 and S37). Namely, the controller CR10 controls the actuator RD3 to stop the chain guide RD2 on the temporary position TP1 for a time period corresponding to the threshold time T2. Thus, it is possible to reduce shock during the multistate gear shift operation. The process enters the Step S1 after the chain guide RD2 is moved to the first target gear position TRP1.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1)

A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Obviously, numerous modifications and variations of the present invention are possible in light of the above teachings. It is therefore to be understood that within the scope of the appended claims, the invention may be practiced otherwise than as specifically described herein.

What is claimed is:

1. A shifting control device for a human-powered vehicle, comprising:
   a controller configured to control an actuator of a gear shifting device to arrange a chain guide of the gear shifting device on a plurality of gear positions,
   the controller being configured to execute a multistage gear shift operation to accomplish a movement between at least three gear positions in a gear shift direction,
   the controller being configured to control the actuator to move the chain guide from a first current gear position to a first target gear position in a gear shift direction and to temporarily arrange the chain guide on a first temporary position in the multistage gear shift operation before stopping the chain guide at the first target gear position,
   the controller being configured to execute a single gear shift operation to accomplish a movement between two gear positions in the gear shift direction,
   the controller being configured to control the actuator to move the chain guide from a second current gear position to a second target gear position in the gear shift direction and to temporarily arrange the chain guide on a second temporary position in the single gear shift operation before stopping the chain guide at the second target gear position, and
   the first temporary position being offset from the second temporary position in the gear shift direction if the first target gear position and the second target gear position correspond to the same gear position of the plurality of gear positions.

2. The shifting control device according to claim 1, wherein
   the controller is configured to vary the first temporary position based on multistage-gear-shift information relating to the multistage gear shift operation.

3. A shifting control device for a human-powered vehicle, comprising:
   a controller configured to control an actuator of a gear shifting device to arrange a chain guide of the gear shifting device on a plurality of gear positions,
   the controller being configured to execute a multistage gear shift operation to accomplish a movement between at least three gear positions in a gear shift direction,
   the controller being configured to control the actuator to move the chain guide from a first current gear position to a first target gear position in a gear shift direction and to temporarily arrange the chain guide on a first temporary position in the multistage gear shift operation before stopping the chain guide at the first target gear position, and
   the controller being configured to vary the first temporary position based on multistage-gear-shift information relating to the multistage gear shift operation.

4. The shifting control device according to claim 3, wherein
   the controller includes a memory configured to store the plurality of gear positions and the multistage-gear-shift information.

5. The shifting control device according to claim 3, wherein
   the multistage-gear-shift information includes a plurality of available temporary positions, and
   the plurality of available temporary positions is partly different from each other.

6. The shifting control device according to claim 5, wherein
   the controller is configured to select one temporary position from the plurality of available temporary positions to vary the first temporary position.

7. The shifting control device according to claim 6, wherein
   the multistage-gear-shift information includes the gear shift direction, and
   the controller is configured to select one temporary position from the plurality of available temporary positions to vary the first temporary position based on the gear shift direction.

8. The shifting control device according to claim 3, wherein
   the multistage-gear-shift information includes a total number of a plurality of single gear shift control commands periodically transmitted from the operating device in response to a single user input.

9. The shifting control device according to claim 6, wherein
   the controller is configured to select one temporary position from the plurality of available temporary positions to vary the first temporary position based on the total number of the plurality of single gear shift control commands.

10. The shifting control device according to claim 8, wherein
    the controller is configured to count the total number of the plurality of single gear shift control commands.

11. The shifting control device according to claim 8, wherein
    the controller is configured to select the first target gear position from the plurality of gear positions based on the first current gear position and the total number of the plurality of single gear shift control commands.

12. The shifting control device according to claim 6, wherein
    the multistage-gear-shift information includes the first current gear position, and
    the controller is configured to select one temporary position from the plurality of available temporary positions to vary the first temporary position based on the first current gear position.

13. The shifting control device according to claim 6, wherein
    the multistage-gear-shift information includes the first target gear position, and
    the controller is configured to select one temporary position from the plurality of available temporary positions to vary the first temporary position based on the first target gear position.

14. The shifting control device according to claim 1, wherein
    the controller is configured to execute the multistage gear shift operation in response to the plurality of single gear shift control commands periodically transmitted from the operating device in response to a single user input.

15. The shifting control device according to claim 14, wherein
the controller is configured to determine a termination of the plurality of single gear shift control commands periodically transmitted from the operating device in response to the single user input, and
the controller is configured to control the actuator to temporarily arrange the chain guide on the first temporary position in the multistage gear shift operation in response to the termination of the plurality of single gear shift control commands.

16. The shifting control device according to claim 1, wherein
the first temporary position is provided between the first current gear position and the first target gear position.

17. The shifting control device according to claim 1, wherein
the first target gear position is provided between the first temporary position and the first current gear position.

18. The shifting control device according to claim 1, wherein
the second temporary position is provided between the second current gear position and the second target gear position.

19. The shifting control device according to claim 1, wherein
the second target gear position is provided between the second temporary position and the second current gear position.

20. A gear shifting device for a human-powered vehicle, comprising:
a base member;
the chain guide movably coupled to the base member;
the actuator configured to move the chain guide relative to the base member; and
the shifting control device according to claim 1.

* * * * *